US009828093B2

(12) United States Patent
Raniere

(10) Patent No.: US 9,828,093 B2
(45) Date of Patent: Nov. 28, 2017

(54) SYSTEM FOR RECHARGING REMOTELY CONTROLLED AERIAL VEHICLE, CHARGING STATION AND RECHARGEABLE REMOTELY CONTROLLED AERIAL VEHICLE, AND METHOD OF USE THEREOF

(71) Applicant: FIRST PRINCIPLES, INC., Albany, NY (US)

(72) Inventor: Keith A. Raniere, Albany, NY (US)

(73) Assignee: FIRST PRINCIPLES, INC., Albany, NY (US)

( * ) Notice: Subject to any disclaimer, the term of this patent is extended or adjusted under 35 U.S.C. 154(b) by 55 days.

(21) Appl. No.: 14/722,623

(22) Filed: May 27, 2015

(65) Prior Publication Data

US 2016/0347450 A1 Dec. 1, 2016

(51) Int. Cl.
*B64C 39/02* (2006.01)
*G08G 5/00* (2006.01)
(Continued)

(52) U.S. Cl.
CPC ........ *B64C 39/024* (2013.01); *B60L 11/1816* (2013.01); *B60L 11/1844* (2013.01);
(Continued)

(58) Field of Classification Search
USPC .............................................................. 701/3
See application file for complete search history.

(56) References Cited

U.S. PATENT DOCUMENTS 4,247,108 A * 1/1981 Tilbor .................... A63H 18/12
104/304
6,040,969 A * 3/2000 Winch ................. H02H 11/002
307/127
(Continued)

FOREIGN PATENT DOCUMENTS

CN 102529905 A * 7/2012
CN 104753144 A * 7/2015
(Continued)

OTHER PUBLICATIONS

NPL Suzuki, Koji et al. Automatic Battery Replacement System for UAVs, Analysis and Design, J Intelligent Robotic System, Proceedings of the International Conference on Unmanned Aircraft Systems, (Sep. 9, 2011).*

(Continued)

*Primary Examiner* — Jean-Paul Cass
(74) *Attorney, Agent, or Firm* — Schmeiser, Olsen & Watts, LLP

(57) ABSTRACT

A system including an aerial vehicle having an airframe and a power source onboard the aerial vehicle, wherein the aerial vehicle includes a landing gear structure having a first electrical contact and a second electrical contact, and a charging station having a first electrical contact and a second electrical contact, wherein the aerial vehicle is programmed to dock with the charging station when the power source is in need of recharging, the docking being a mechanical engagement between the first electrical contact and the second electrical contact of the aerial vehicle with the first electrical contact and the second electrical contact of the charging station is provided. A method for continuous surveillance utilizing the aerial vehicles and charging stations is also provided.

19 Claims, 25 Drawing Sheets

(51) Int. Cl.
- *B64C 25/52* (2006.01)
- *B60L 11/18* (2006.01)
- *B64F 1/00* (2006.01)

(52) U.S. Cl.
CPC ............. *B64C 25/52* (2013.01); *B64F 1/007* (2013.01); *B64C 2201/024* (2013.01); *B64C 2201/042* (2013.01); *B64C 2201/146* (2013.01)

(56) References Cited

U.S. PATENT DOCUMENTS

| | | | |
|---|---|---|---|
| 6,634,851 B1* | 10/2003 | Bonora | B25J 9/042 414/744.3 |
| 6,908,061 B2 | 6/2005 | Akahori | |
| 7,248,018 B2 | 7/2007 | Sanders, Jr. et al. | |
| 7,318,564 B1 | 1/2008 | Marshall | |
| 7,398,946 B1 | 7/2008 | Marshall | |
| 7,714,536 B1 | 5/2010 | Silberg et al. | |
| 7,894,940 B2* | 2/2011 | Kumhyr | B25J 19/005 180/2.1 |
| 8,167,234 B1* | 5/2012 | Moore | B64C 37/00 244/17.23 |
| 8,307,922 B2 | 11/2012 | Perlman et al. | |
| 8,418,959 B2 | 4/2013 | Kang et al. | |
| 8,999,542 B2* | 4/2015 | Kondo | B25F 5/02 429/88 |
| 2006/0175466 A1* | 8/2006 | Snediker | B64C 25/68 244/110 G |
| 2007/0018033 A1* | 1/2007 | Fanucci | F42B 10/143 244/3.27 |
| 2008/0191091 A1* | 8/2008 | Hoisington | B64C 39/024 244/110 F |
| 2009/0082957 A1* | 3/2009 | Agassi | B60L 3/12 701/532 |
| 2010/0127660 A1* | 5/2010 | Cook | H01Q 1/248 320/108 |
| 2011/0049992 A1* | 3/2011 | Sant'Anselmo | F03D 9/007 307/64 |
| 2011/0077809 A1* | 3/2011 | Leary | B60L 11/1824 701/22 |
| 2011/0181244 A1* | 7/2011 | Badger | B60L 11/1816 320/117 |
| 2011/0254503 A1* | 10/2011 | Widmer | B60L 11/182 320/108 |
| 2011/0301784 A1 | 12/2011 | Oakley et al. | |
| 2012/0012695 A1* | 1/2012 | Robinson | B64F 1/06 244/63 |
| 2012/0083945 A1* | 4/2012 | Oakley | B64C 27/08 701/2 |
| 2012/0235633 A1 | 9/2012 | Kesler et al. | |
| 2012/0271491 A1* | 10/2012 | Spata | G01W 1/00 701/3 |
| 2012/0286730 A1 | 11/2012 | Bonny | |
| 2013/0175390 A1* | 7/2013 | Woodworth | B64D 27/26 244/54 |
| 2013/0249480 A1 | 9/2013 | Paparo et al. | |
| 2014/0055078 A1* | 2/2014 | Jing | H02J 7/0044 320/103 |
| 2015/0035437 A1* | 2/2015 | Panopoulos | F21V 14/02 315/112 |
| 2015/0059649 A1* | 3/2015 | van der Sluis | A01J 5/0175 119/14.08 |
| 2015/0097530 A1* | 4/2015 | Scarlatti | B60L 11/1827 320/109 |
| 2015/0314207 A1* | 11/2015 | Chen | A63H 30/04 446/37 |
| 2016/0039295 A1* | 2/2016 | Madurai-Kumar | B60L 11/184 320/109 |
| 2016/0116914 A1* | 4/2016 | Mucci | G05D 1/101 701/2 |
| 2016/0137311 A1* | 5/2016 | Peverill | B64C 39/024 244/110 C |

FOREIGN PATENT DOCUMENTS

| | | | | |
|---|---|---|---|---|
| CN | 104898690 A | * | 9/2015 | |
| FR | KR 20100028502 A | * | 3/2010 | B01J 23/85 |
| KR | 20090082957 A | * | 8/2009 | |
| KR | 2010050197 A | | 5/2010 | |
| KR | 2010050652 A | | 5/2010 | |
| KR | 2010050653 A | | 5/2010 | |

OTHER PUBLICATIONS

Suzuki, Koji A. O. et al. Automatic Battery Replacement System for UAVs: Analysis and I-22 Design, J Intelligent Robotic System, Proceedings of the International Conference of Unmanned Aircraft Systems, (Sep. 9, 2011).

International Search Report and Written Opinion for PCT Application No. PCT/US16/34031, dated Jul. 12, 2016.

* cited by examiner

SYSTEM FOR RECHARGING REMOTELY CONTROLLED AERIAL VEHICLE, CHARGING STATION AND RECHARGEABLE REMOTELY CONTROLLED AERIAL VEHICLE, AND METHOD OF USE THEREOF

FIELD OF TECHNOLOGY

The following relates to a system and method for recharging remotely controlled aerial vehicles and more specifically to embodiments of a rechargeable, remotely controlled aerial vehicle and charging station.

BACKGROUND

Remotely controlled or remotely piloted aerial vehicles, such as helicopters, drones, and airplanes, have a wide variety of uses. Among those uses includes mobile surveillance in both domestic and foreign environments for criminal investigation and military and intelligence operations, respectively. For example, aerial vehicles may include a microphone and camera to collect information in various locations, with the ability to remain stealth and/or move with the target. Moreover, aerial vehicles are used by hobbyists who enjoy flying the vehicles for recreation. An increasing number of aerial vehicles are battery powered. The capacity of the battery is limited, but is required to maintain flight and power the instruments associated with the aerial vehicles. If the battery power is drained to a certain amount, it must be recharged or replaced. However, replacing or recharging the battery requires the aerial vehicle to return to the operator for swapping of batteries or charging of the on-board battery.

Thus, a need exists for an apparatus and method for recharging or replacing a battery of a battery power, remotely controlled aerial vehicle in the field.

SUMMARY

A first aspect relates generally to a remotely controlled aerial vehicle comprising: an airframe, a landing gear structure operably connected to the airframe, the landing gear structure including a first skid and a second skid, wherein the first skid and the second skid each have a recessed area along a bottom portion of the first skid and the second skid, a first electrical contact connected to the first skid by a first biasing element, and a second electrical contact connected to the second skid by a second biasing element, wherein the first biasing element and the second biasing element urge the first electrical contact and the second electrical contact, respectively, in a direction away from the first skid and the second skid when the first electrical contact and the second electrical contact are mechanically engaged with a charging station to promote contact therebetween.

A second aspect relates generally to a system comprising: an aerial vehicle having an airframe and a power source onboard the aerial vehicle, wherein the aerial vehicle includes a landing gear structure having a first electrical contact and a second electrical contact, and a charging station having a first electrical contact and a second electrical contact, wherein the aerial vehicle is programmed to dock with the charging station when the power source is in need of recharging, the docking being a mechanical engagement between the first electrical contact and the second electrical contact of the aerial vehicle with the first electrical contact and the second electrical contact of the charging station.

A third aspect relates generally to a charging station for recharging a power source of a remotely controlled aerial vehicle, the charging station comprising: a first electrical contact configured to engage a first skid of the remotely controlled aerial vehicle, the second electrical contact being electrically coupled to an external power source, a second electrical contact configured to engage a second skid of the remotely controlled aerial vehicle, the second electrical contact being electrically coupled to the external power source, a first biasing element operably connected to the first electrical contact at a first end of the first biasing element and operably connected to a first surface of the charging station at a second end of the first biasing element, the first surface being located in a first recessed area of the charging station, and a second biasing element operably connected to the second electrical contact at a first end of the second biasing element and operably connected to a second surface of the charging station at a second end of the second biasing element, the second surface being located in a second recessed area of the charging station, wherein the first biasing element and the second biasing element urge the first electrical contact and the second electrical contact, respectively, in a direction away from the charging station when the first electrical contact and the second electrical contact are mechanically engaged with a landing gear structure of the aerial vehicle to promote contact therebetween.

A fourth aspect relates generally to a method of continuous security surveillance of a community, comprising: programming a flight path for an aerial vehicle to fly from a first location to a second location of the community, and placing a charging station for the aerial vehicle at the first location and the second location, wherein the programmed flight path includes stops at the charging station to recharge a power source of the aerial vehicle.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
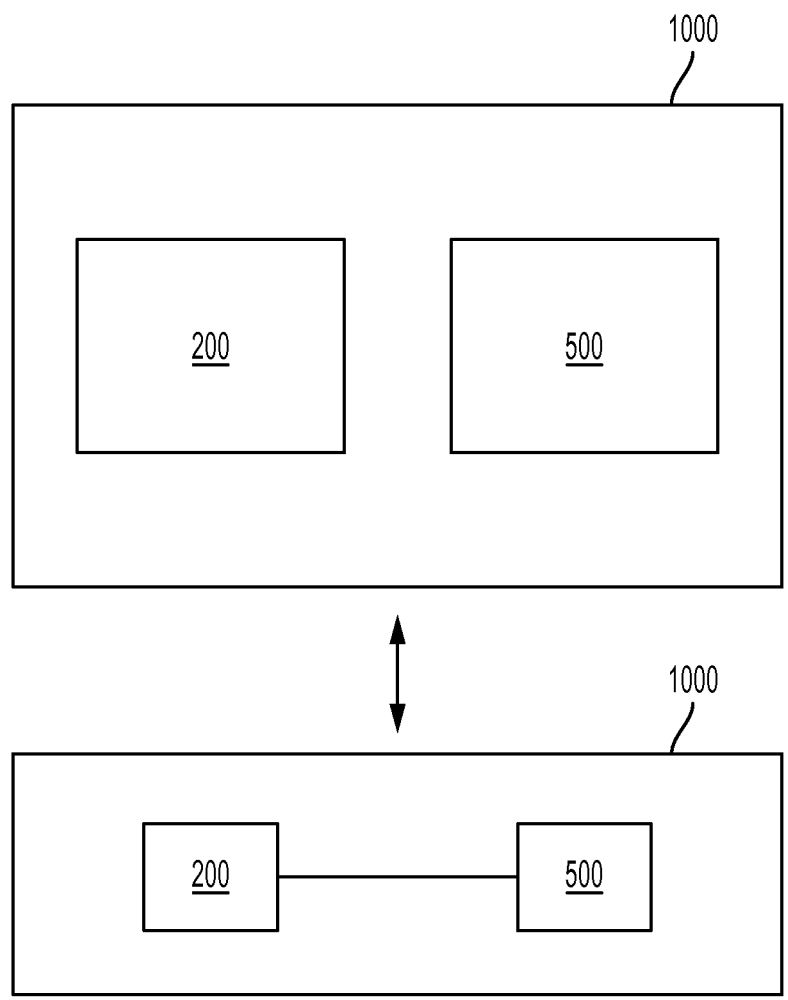
FIG. 1 depicts a schematic view of an embodiment of a system for recharging a power source.
Figure 2:
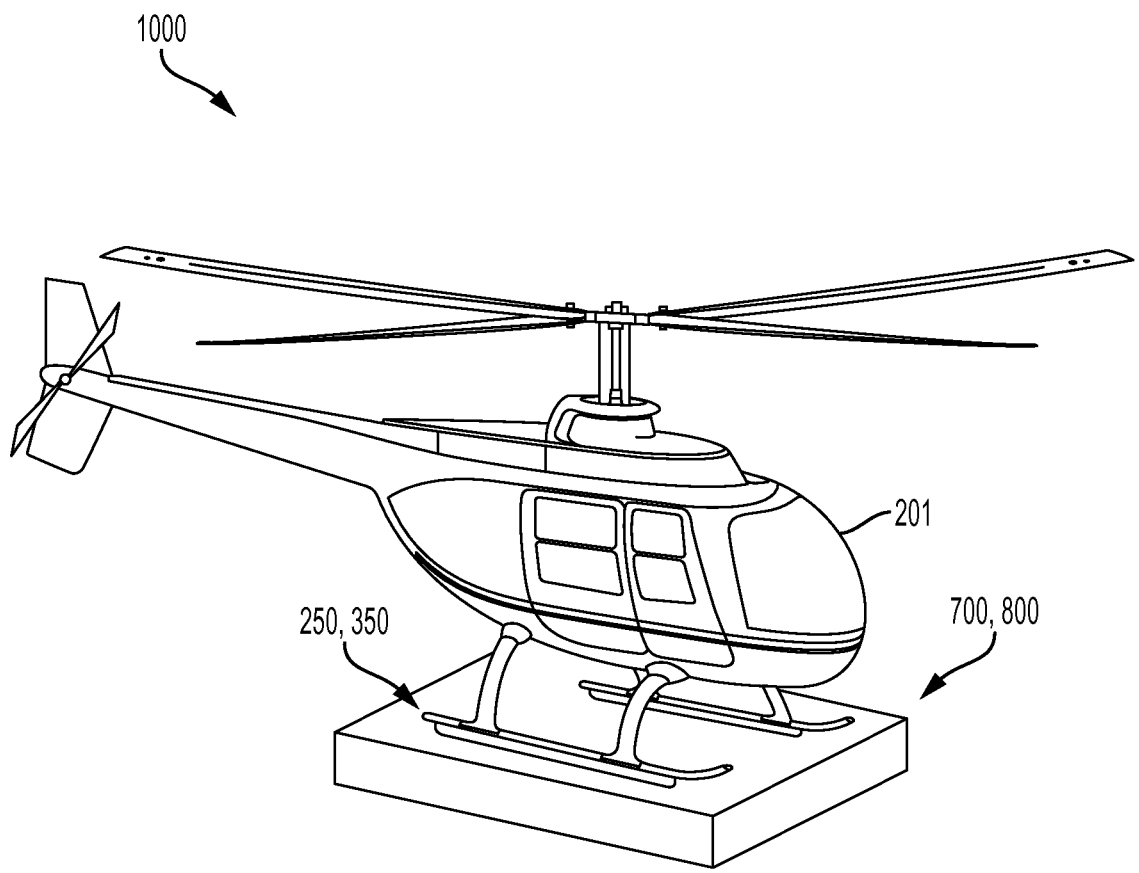
FIG. 2 depicts a perspective view of an embodiment of an aerial vehicle docked with an embodiment of a charging station.

Referring to the drawings, FIGS. 1 and 2 depict an embodiment of a system 1000. Embodiments of system 1000 may be a system for replenishing a power source of a remotely controlled aerial vehicle. Embodiments of system 1000 may be a system for recharging an on-board battery of a remotely controlled aerial vehicle without having to return to the operator. Moreover, embodiments of the system 1000 may be a system for recharging a remotely controlled aerial vehicle having a programmable flight path, wherein the remotely controlled aerial vehicle can be programmed to engage with a charging station for recharging, as shown in FIG. 2. Embodiments of system 1000 may include a rechargeable, remotely controlled aerial vehicle 200 and a charging station 500. The remotely controlled aerial vehicle 200 and the charging station 500 may be able to communicate with each other, for example over a communication network, a dedicated network or band, a direct communication link, etc. For example, the charging station 500 may communicate with the remotely controlled aerial vehicle 200, and vice versa, utilizing radio spectrum, Internet, Bluetooth®, satellite, and the like. Communication between the charging station 500 and the remotely controlled aerial vehicle 200 can allow for precise docking, as will be described in greater detail infra.

Figure 3:
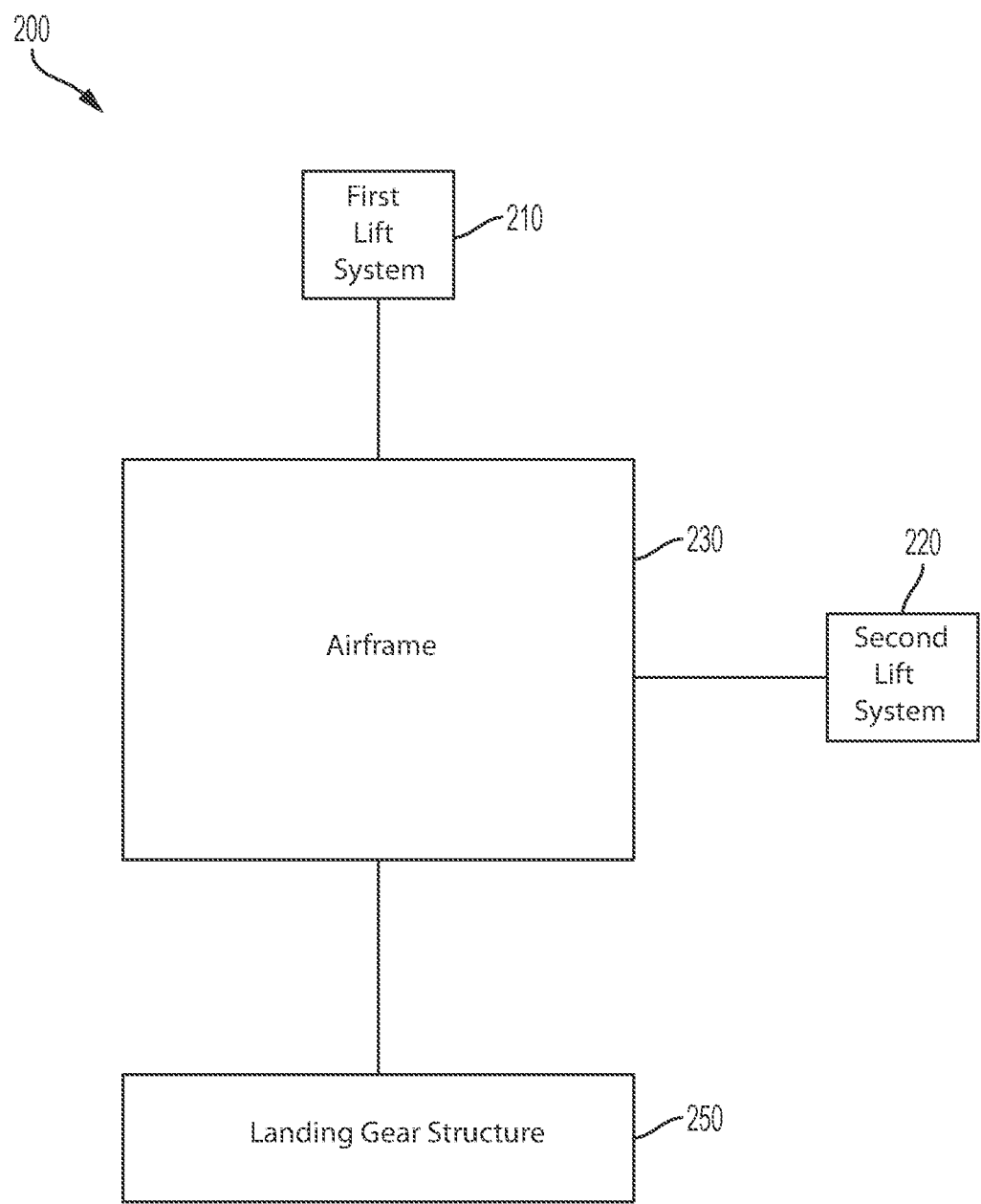
FIG. 3 depicts a schematic view of an embodiment of an aerial vehicle.
Figure 4:
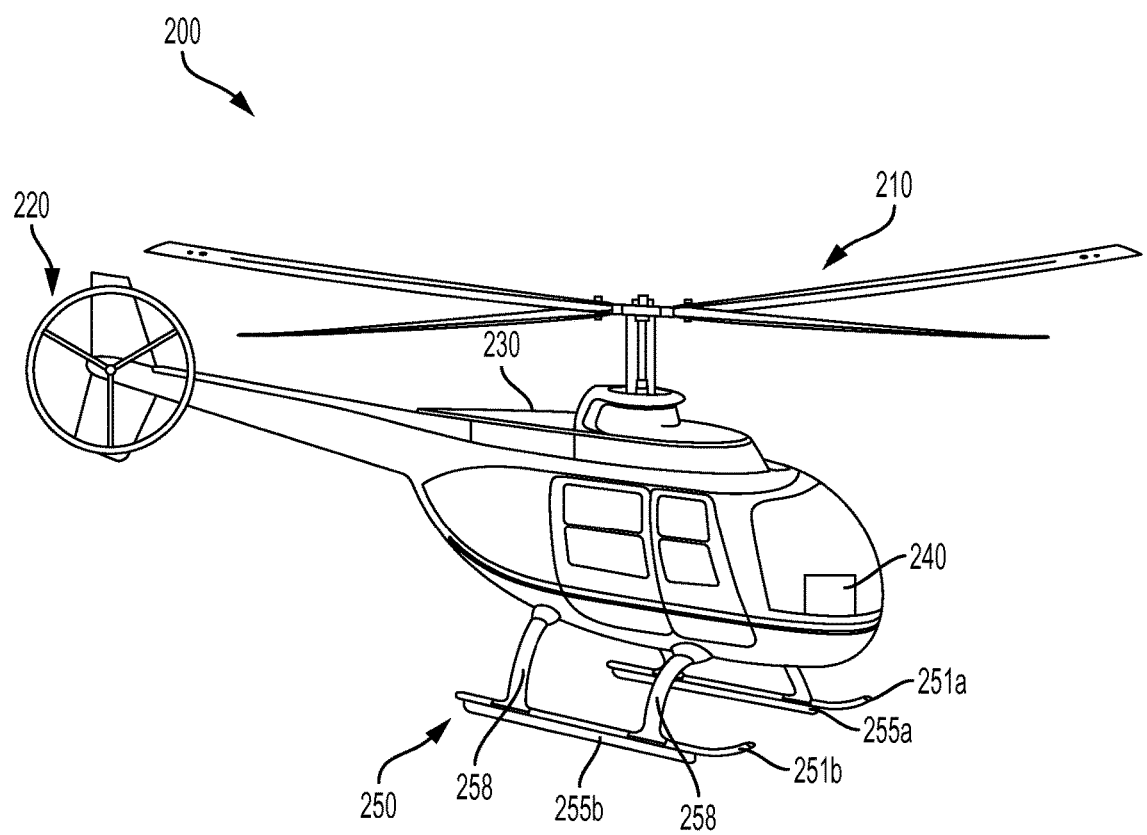
FIG. 4 depicts a perspective view of an embodiment of an aerial vehicle having a landing gear structure.
Figure 5:
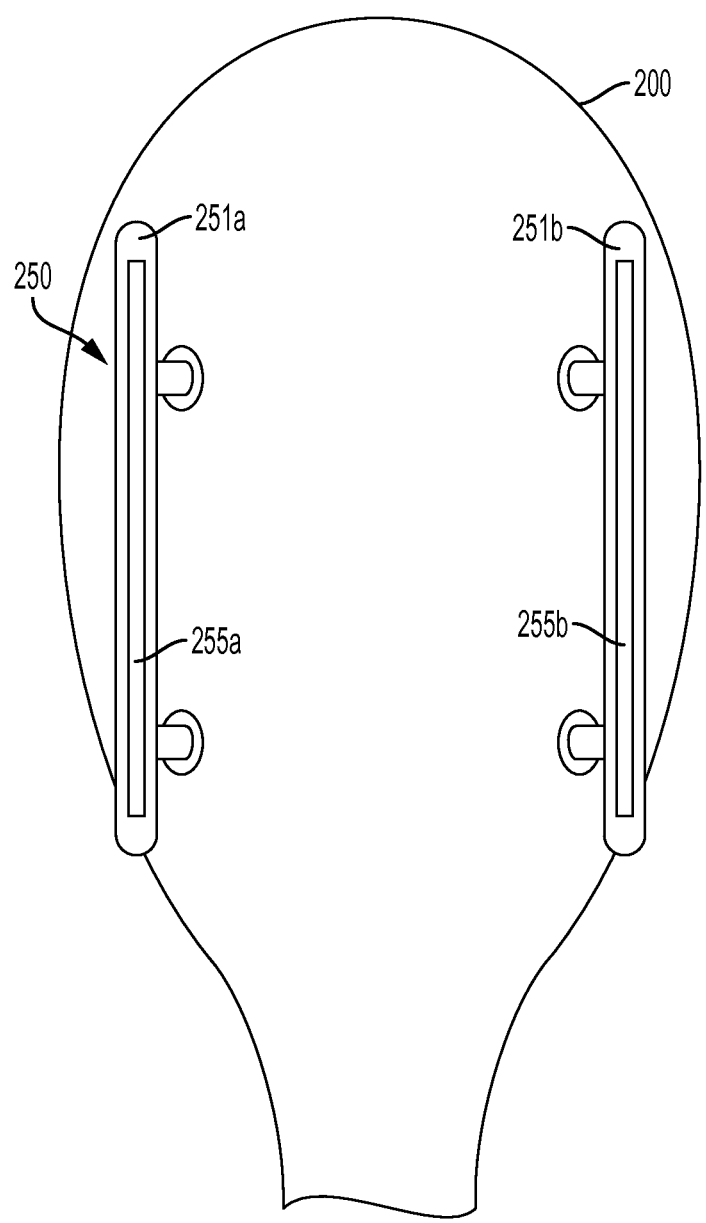
FIG. 5 depicts a bottom view of a first embodiment of a landing gear structure of the aerial vehicle.

FIGS. 3 and 4 depict an embodiment of the aerial vehicle 200. Embodiments of the aerial vehicle 200 may be an electric aerial vehicle, such as battery powered, and may be radio-controlled ("RC"), remotely controlled, computer programmable, and the like. Exemplary embodiments of the remotely-controlled aerial vehicle 200 may be an unmanned aerial vehicle (UAV), an RC helicopter, unmanned air system (UAS), an RC airplane, a coaxial helicopter, a drone, a remotely piloted aircraft (RPA), a programmable aerial vehicle, and the like. Embodiments of the aerial vehicle 200 may include an integrated automatic flight control system (e.g. onboard computers), core autopilot functions, global positioning system (GPS) management, full-function navigation systems, rapid launch capability, real-time in-flight switching means between remote controlled flight, autopilot directed flight, ground station controlled flight, and the like.

Further, embodiments of the aerial vehicle 200 may include a chassis or airframe 230, for example, a body or frame component that comprises the base mechanical structure of the aerial vehicle 200. Embodiments of the airframe 230 may house or mechanically support electrical components, computers, transmitters, receivers, sensors, lights, motors, controllers, shafts, etc. and a power source 261, as known to those skilled in the art. Embodiments of the power source 261 may be a rechargeable battery, such as a lithium-ion (Li-ion) or a lithium-polymer (Lipo) battery. Embodiments of the power source 261 may be coupled to an induction coil for inductive charging, wherein the induction coil located within the aerial vehicle 200 take power from an electromagnetic field generated by an induction coil of the charging station 500 and converts it back to electrical energy (current) that can charge the onboard battery, or power source 261. The power source 261, or potentially multiple power sources, of the aerial vehicle 200 may supply power to the required components. The airframe 230 may be comprised of lightweight, durable material that can reduce weight requirements for lift, such as carbon fiber, aluminum, plastics, composites, and the like, or a combination thereof. Operably connected to the airframe 230 may be a propulsion or lift system 210, 210. The propulsion or lift system may include a first lift system 210 and a second lift system 220.

For example, the first lift system 210 may be a main rotor, and the second lift system 220 may be a tail rotor, operably connected to the airframe 230 by a tail boom. However, those skilled in the art should appreciate that various propulsion systems may be utilized to accommodate the specific type of aerial vehicle 200 (e.g. helicopters, drones, airplanes, etc.). Embodiments of the aerial vehicle 200 may further include a landing gear structure 250, wherein the landing gear structure 250 may be operably coupled to the airframe 230. Embodiments of the landing gear structure 250 may be comprised of lightweight, durable material that can reduce weight requirements for lift, such as carbon fiber, plastics, composites, and the like, or a combination thereof.

With continued reference to FIG. 4, and additional reference to FIGS. 5-7B, embodiments of the landing gear structure 250 may include a first skid 251a and a second skid 251b. Embodiments of the skids 251a, 251b may be an elongated structure to facilitate a controlled, balanced landing of the aerial vehicle 200. Each skid 251a, 251b may include at least one connecting shaft 258. The connecting shaft 258 may structurally connect/couple the landing gear structure 250 to the airframe 230. Embodiments of the connecting shaft 258 may be hollow, forming an open channel between a recessed portion 270 of the skids 251a, 251b and a power source of the aerial vehicle 200. Embodiments of the recessed portion 270 may be a recess, a gap, a void, a space, or opening along a bottom portion of the skid 251a, 251b. Some embodiments of the landing gear structure 250 may also include one or more cross-tubes to connect the first skid 251a and the second skid 251b. Moreover, embodiments of the first skid 251a and the second skid 251b may include a first contact 255a and a second contact 255b, respectively. Contacts 255a, 255b may be a conductive element configured to engage and/or dock with a corresponding contact 755a, 755b located on the charging station to recharge an onboard power source of the aerial vehicle 200. Thus, embodiments of the contacts 255a, 255b may be comprised of an electrically conductive material, or may be coated with an electrically conductive material. Contacts 255a, 255b may be sized and dimensioned to fit at least partially win the recessed portion 270 of each skid 251a, 251b. Further, embodiments of the contacts 255a, 255b may be partially housed or covered by a non-conductive material, such as a plastic housing component, wherein at least a part of the conductive contact 255a, 255a is exposed or can be exposed to mechanically contact a corresponding contact of the charging station 500, while also facilitating electrical contact with the biasing elements 257a, 257b.

Figure 6A:
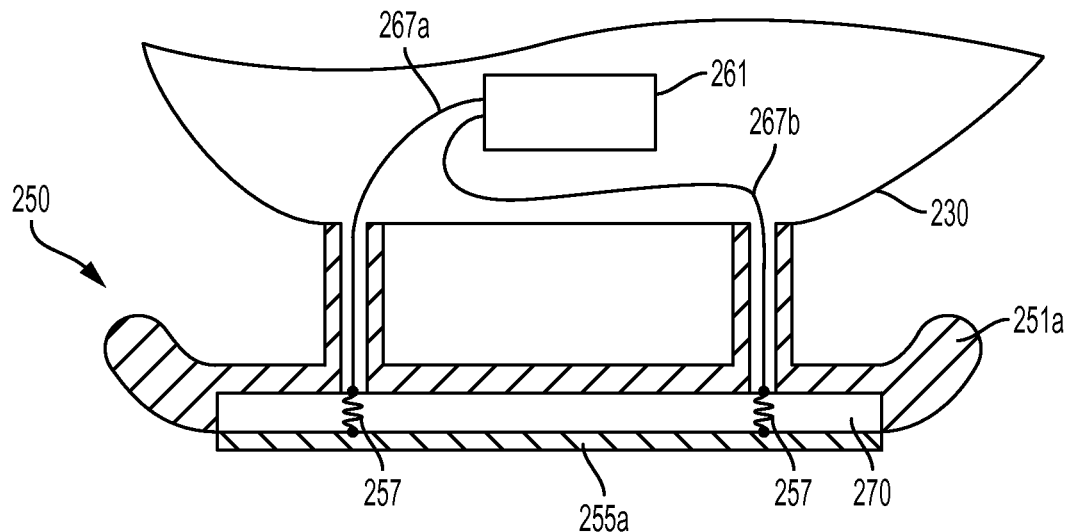
FIG. 6A depicts a cross-sectional view of a first embodiment of a first skid of the landing gear structure in a first position.
Figure 7A:
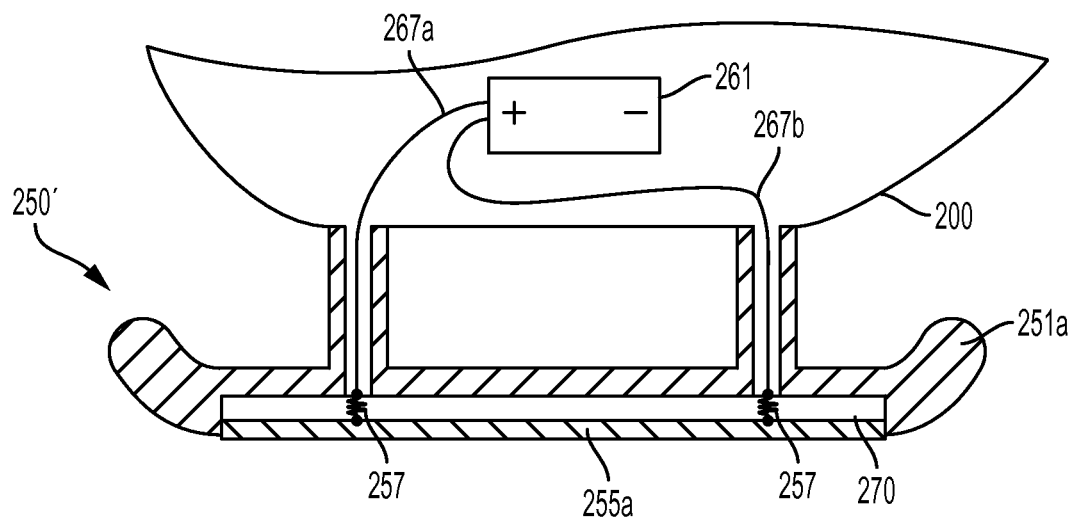
FIG. 7A depicts a cross-sectional view of the first embodiment of the first skid of the landing gear structure in a second position.

Each of the contacts 255a, 255b may be coupled to each skid 251a, 251b, respectively, by at least one or both of a first biasing element 257a and a second biasing element 257b. In some embodiments, only a single biasing element may be utilized. For instance, the biasing elements 257a, 257b may be connected to the contacts 255a, 255b at one end, and connected to the skid 251a, 251b at the other. This connection can be established in a variety of ways, including a soldered connection. Embodiments of the first and second biasing elements 257a, 257b may be a spring, a coiled structure, a compression spring, or any component that exhibits a biasing quality. Embodiments of the first and second biasing elements 257a, 257b may be electrically conductive to electrically connect the contacts 255a, 255b to the power source of the aerial vehicle 200. The biasing elements 257a, 257b may bias the contacts 255a, 255b when the aerial vehicle 200 lands on the charging station 500, urging the contacts 255a, 255a toward the electrical contacts 755a, 755b of the charging station 500 to promote, establish, ensure, etc. firm electrical and mechanical contact between the contacts of the aerial vehicle 200 and the contacts of the charging station. In other words, the electrical contacts 255a, 255b of the skids 251a, 251b are depressible within the skids 251a, 251b. The recessed portion 270 of each skid 251a, 251b may accommodate the insertion, or partial insertion of the contacts 255a, 255b. FIG. 6A depicts an embodiments of the aerial vehicle 200 where the electrical contact 255a is in a first position. The first position may refer to a position of non-engagement of the electrical contact 255a with an electrical contact of the charging station 500, or a flight position. FIG. 7A depicts an embodiment of the aerial vehicle 200 where the electrical contact 255a is in a second position. The second position may refer to a position of engagement with an electrical contact of the charging station 500 or a ground surface. In the second position, the biasing elements 257a, 257b are compressed, exerting a biasing force against the contact 255a, urging the contact 255a in an opposing direction (i.e. toward the charging station). The biasing effect promotes continued electrical and mechanical contact during charging, until the aerial vehicle 200 disengages or departs from the charging station 500.

Figure 6B:
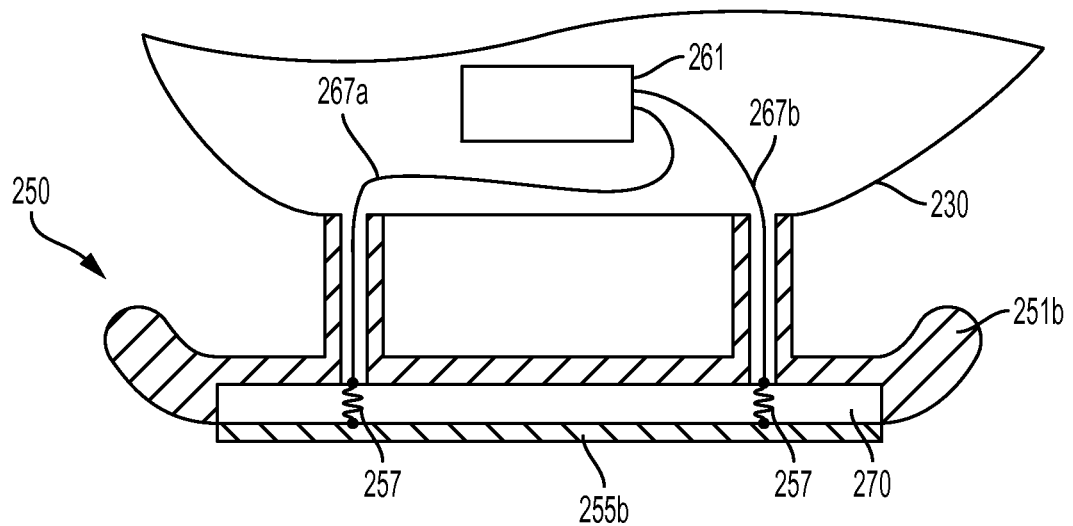
FIG. 6B depicts a cross-sectional view of a first embodiment of a second skid of the landing gear structure in a first position.
Figure 7B:
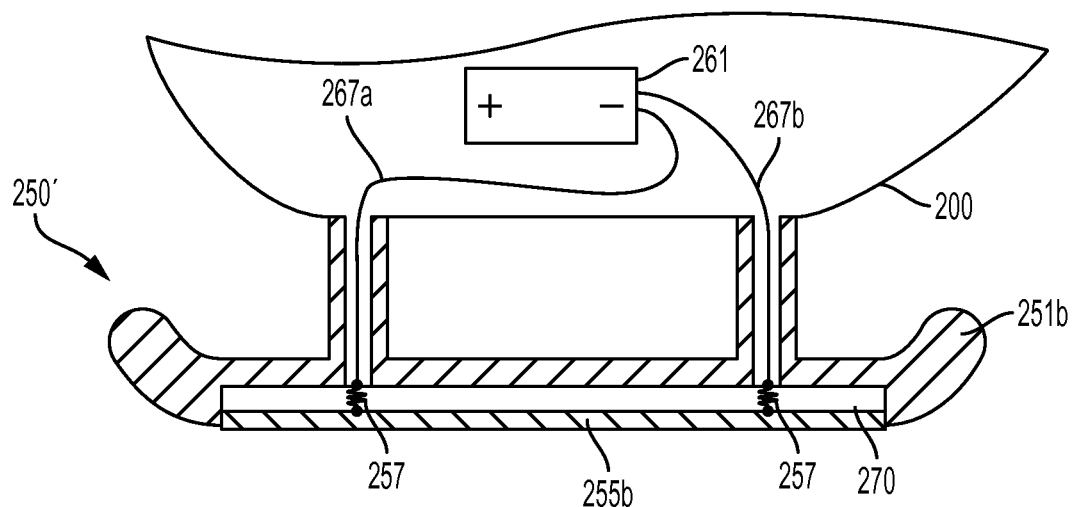
FIG. 7B depicts a cross-sectional view of the first embodiment of the second skid of the landing gear structure in a second position.
Figure 8:
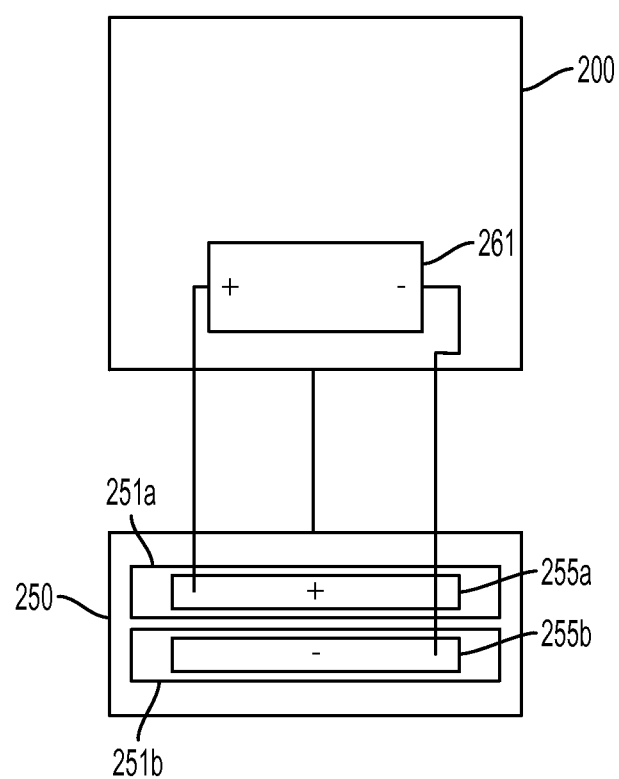
FIG. 8 depicts a schematic view of a first embodiment of a power source of the aerial vehicle being electrically coupled to electrical contacts of the landing gear structure.

Referring still to FIGS. 6A-7B, and referring additionally to FIG. 8, embodiments of the biasing elements 257a, 257b may establish a conductive path to the power source 261 of the aerial vehicle 200. For instance, a wire 267a, 267b may be mechanically and electrically connected to (e.g. soldered) to the biasing elements 257a, 257b. Embodiments of the wires 267a, 267b may be an electrical wire or cable capable of conducting an electrical signal (e.g. current). The wires 267a, 267b may pass through the at least one connecting shaft 258 of the landing gear structure 250 to reach the power source 261 of the aerial vehicle 200. In some embodiments, each skid 251a, 251b may include two connecting shafts 258 that each allow for a passage of a wire 267a, 267b through the landing gear structure 250 to the power source 261. However, the wires 267a, 267b may pass through single connecting shaft 258. In embodiments where the wires 267a, 267b pass through a single connecting shaft 258, the wires 267a, 267b may be electrically isolated from one another, through a protective jacket or sleeve made out of a dielectric material. However, embodiments of the wires 267a, 267b may include a protective, dielectric jacket even if they are not designed to make incidental contact.

Moreover, embodiments of the aerial vehicle 200 may have each contact 255a, 255b of skid 251a, 251b, respectively, electrically corresponding to either a positive or negative terminal on the power source 261. For example, embodiments of the first contact 255a operably connected to the first skid 251a may be assigned to charging a positive terminal of the power source 261, while the second contact 255b operably connected to the second skid 251b may be assigned to charging a negative terminal of the power source 261. As shown in FIGS. 6A and 7A, an electrical continuity path can be established by the first contact 255a being in electrical contact with at least one of the first and second biasing elements 257a, 257b of the first skid 251a, which is electrically connected to the positive terminal of the power source 261 via wire 267a and/or 267b. Conversely, as shown in FIGS. 6B and 7B, an electrical continuity path can be established by the second contact 255b being in electrical contact with at least one of the first and second biasing elements 257a, 257b of the second skid 251b, which is electrically connected to the negative terminal of the power source 261 via wire 267a and/or 267b. FIG. 8 schematically shows the electrical coupling of the contacts 255a, 255b and the power source 261. In an alternative embodiment, the first contact 251a may be electrically connected to the negative terminal, while the second contact 255b may be electrically connected to the positive terminal.

Figure 9:
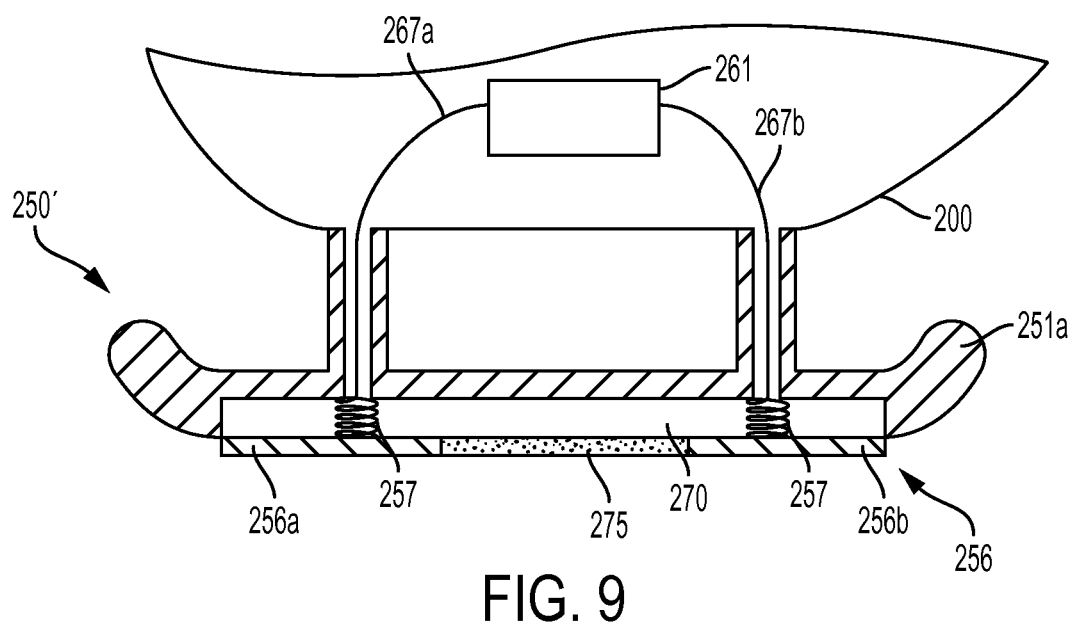
FIG. 9 depicts a cross-sectional view of a second embodiment of a first skid of the landing gear structure in a first position.
Figure 10:
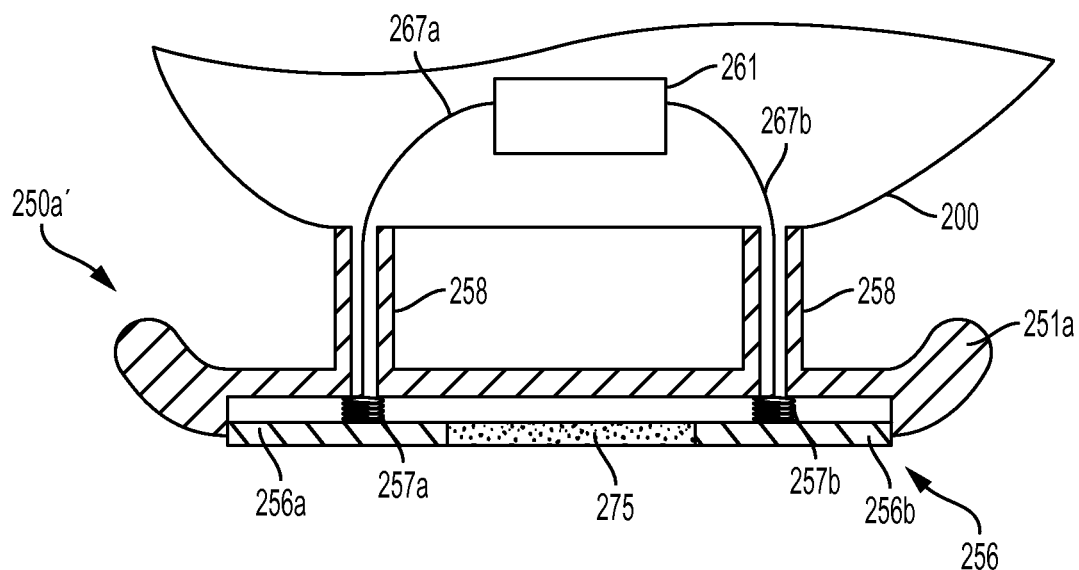
FIG. 10 depicts a cross-sectional view of the second embodiment of a first skid of the landing gear structure in a second position.
Figure 11:
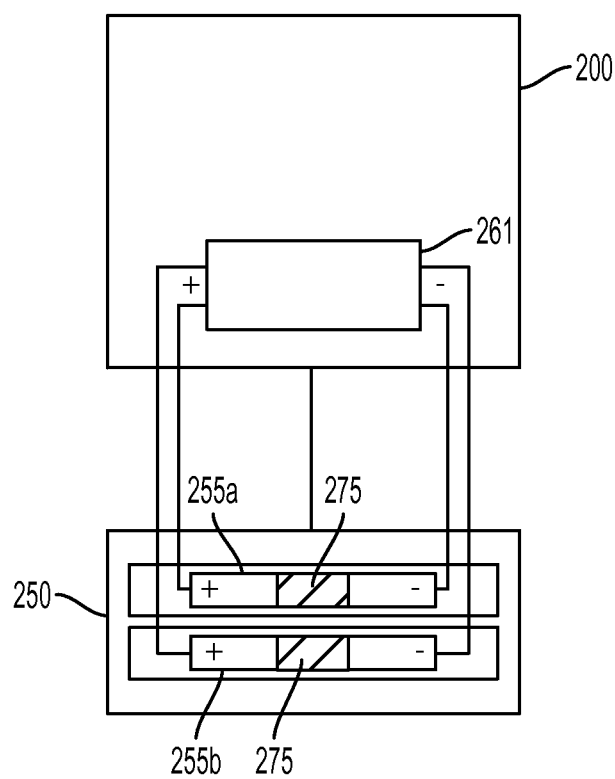
FIG. 11 depicts a schematic view of a second embodiment of a power source of the aerial vehicle being electrically coupled to electrical contacts of the landing gear structure.

FIGS. 9-11 depicts an alternative embodiment of aerial vehicle 200 having a landing gear structure 250a. Embodiments of the landing gear structure 250a may share the same structural and functional aspects as the landing gear structure 250. For instance, embodiments of the landing gear structure 250a may include one or more connecting shafts 258, a first skid 251a, a second skid 251b, wherein electrical contacts are connected to the skids 251a, 251b via biasing elements 257a, 257b, and biasing elements 257a, 257b that include wires that may pass through individual connecting shafts 258 or through the same connecting shaft 258 to electrically connect with the power source 261. However, embodiments of an aerial vehicle that includes landing gear structure 250a may include skids 251a, 251b that are each supplying a charge for the positive and negative terminals for the power source 261. Embodiments of the landing gear structure 250a may include skids 251a, 251b that are each biasingly engaged with a respective contact 256 that has a first portion 256a and a second portion 256b. Embodiments of the first portion 256a may have a first polarity, while embodiments of the second portion 256b may have a second polarity, wherein the first and second polarities are opposite. For example, the first portion 256a may be electrically compatible with a positive terminal of the power source 261, and the second portion 256b may be electrically compatible with a negative terminal of the power source 261. Embodiments of the electrical contact 256 may include a dielectric component 275 disposed between the first portion 256a and the second portion 256b to electrically isolate the first portion 256a and the second portion 256b. Embodiments of the dielectric component 275 may be an elastomeric material, such as rubber, or may be a dense foam, a plastic component, or any other suitable material that exhibits insulating properties.

Figure 12:
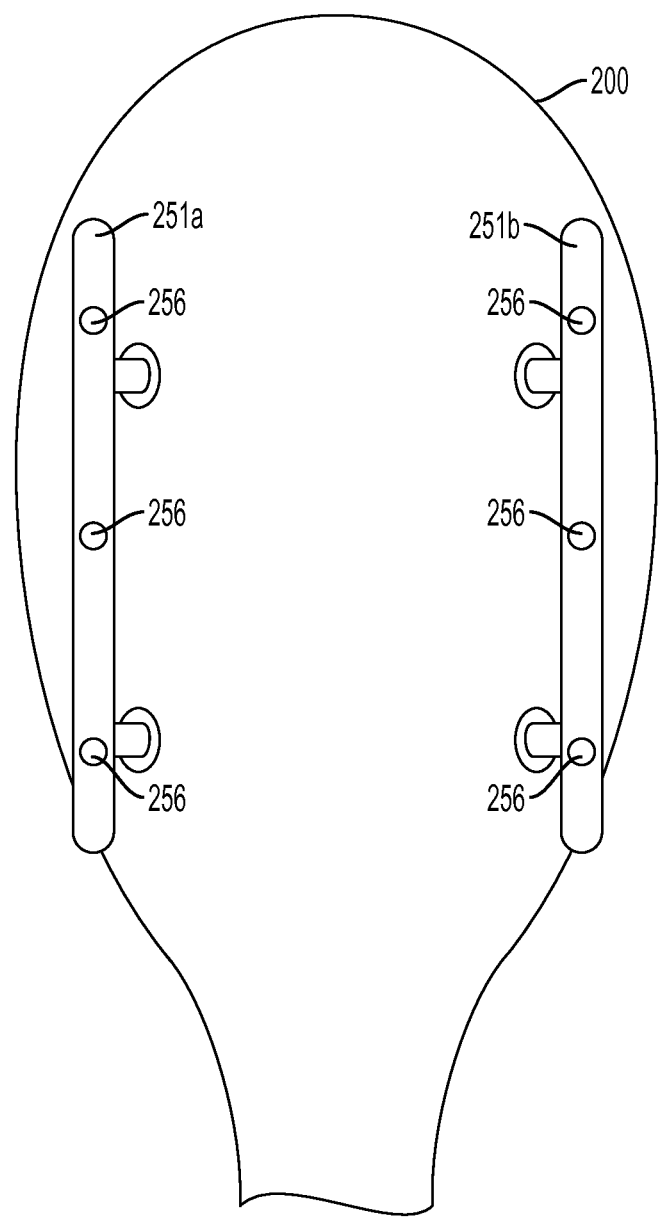
FIG. 12 depicts a bottom view of a second embodiment of a landing gear structure including multiple contacts on one or more of the skids of the landing gear structure.

Accordingly, the aerial vehicle 200 having a landing gear structure 250a may include skids 251a, 251b that can each electrically charge the power source 261, as schematically illustrated by FIG. 11. This can be helpful if one of the skids 251a, 251b either misses the target upon landing, becomes dislodged during charging, or a failure occurs in one or more of the components associated with that skid. If such an event occurs, then the remaining skid may still complete the task of recharging the power source 261. In addition, if an aerial vehicle includes an additional power source, such as power source 261, then each skid may be configured to charge one of the power sources, while the other skid is configured to charge the other. In yet another embodiment of the aerial vehicle 200, more than once contact 256 may be coupled to each of the skids 251a, 251b via a biasing element containing an electrical connection to one or more power sources. For example, embodiments may include multiple contacts 256 on one or more of the skids to more efficiently charge the power source 261, or to provide a charge to more than two batteries on the aerial vehicle 200, as shown in FIG. 12.

Figure 13:
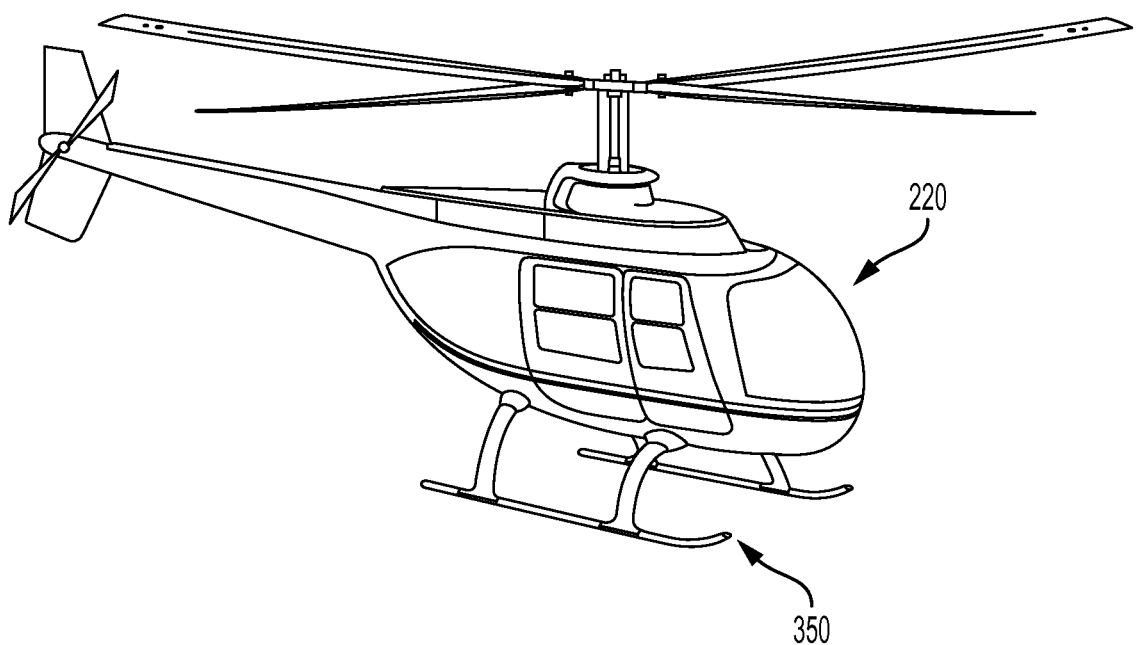
FIG. 13 depicts a perspective view of a third embodiment of the landing gear structure.
Figure 14:
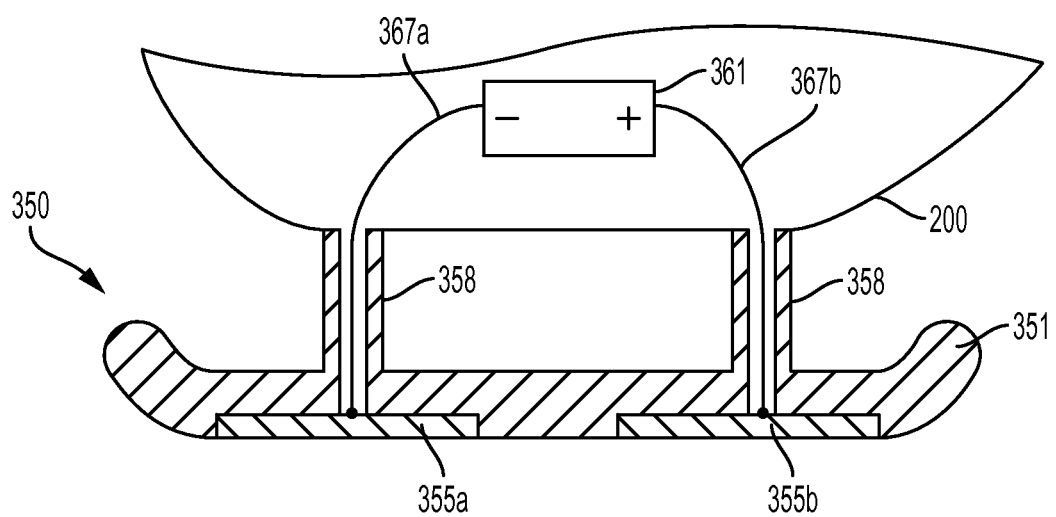
FIG. 14 depicts a cross-sectional view of a third embodiment of the first skid.
Figure 15:
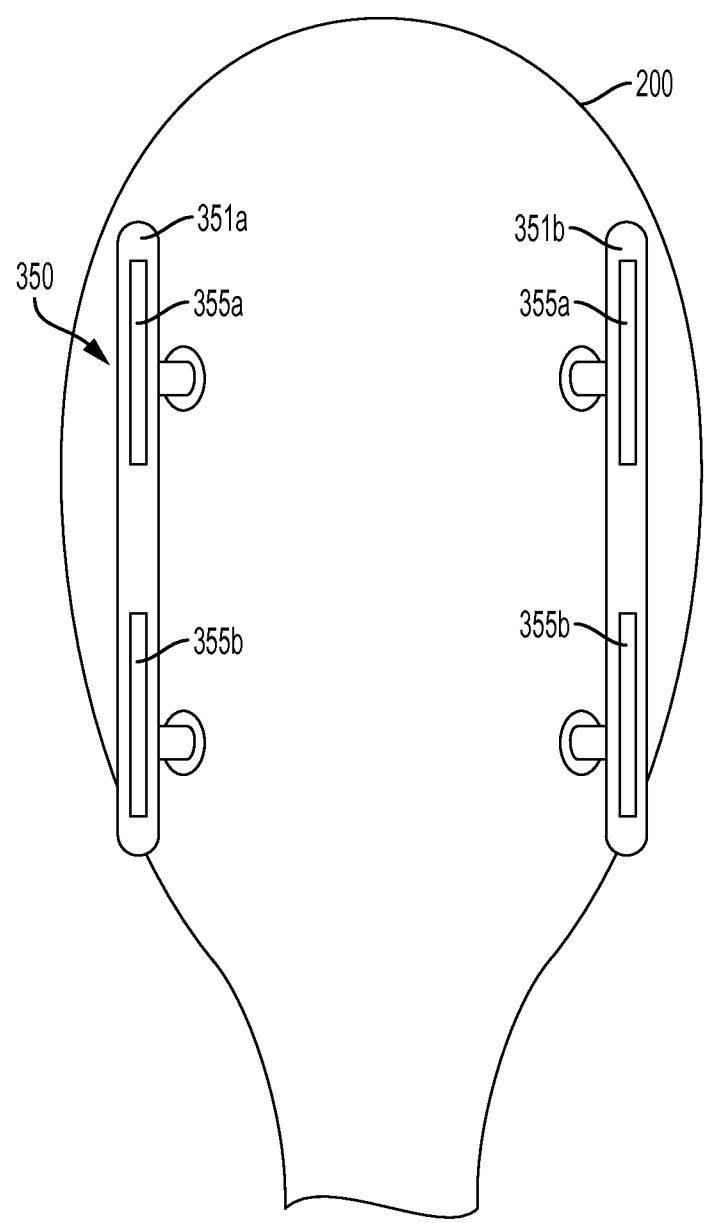
FIG. 15 depicts a bottom view of the third embodiment of the landing gear structure.

Referring now to FIGS. 13-15, embodiments of aerial vehicle 200 may include landing gear structure 350. Embodiments of the landing gear structure 350 may share the same structural and functional aspects as the landing gear structure 250, 250a. For instance, embodiments of the landing gear structure 350 may include one or more connecting shafts 358, a first skid 351a, and a second skid 351b. However, embodiments of an aerial vehicle that includes landing gear structure 350 may include contacts 355a, 355b that are not biasingly engaged with the skids 351a, 351b. Instead, the contacts 355a, 355b may be formed within the skids 351a, 351b, respectively, and each skid 351a, 351b may include a first contact 355a and a second contact 355b, so that the skids 351a, 351b may be equivalent. In other words, the contacts 355a, 355b may not be depressible within a recessed portion or opening in the skids 351a, 351b. In some embodiment, the contacts 355a, 355b may be statically disposed within or at least substantially within the skids 351a, 351b, wherein the contacts 355a, 355b are flush or slightly protrude from a bottom surface of the skids 351a, 351b. Wires 367a, 367b, which may be structurally and functionally the same or substantially the same as wires 267a, 267b, are electrically and mechanically connected directly to the contacts 355a, 355b. To electrically isolate the contacts 355a, 355b, an integral portion of the skids 351a, 351b may be located therebetween.

Figure 20:
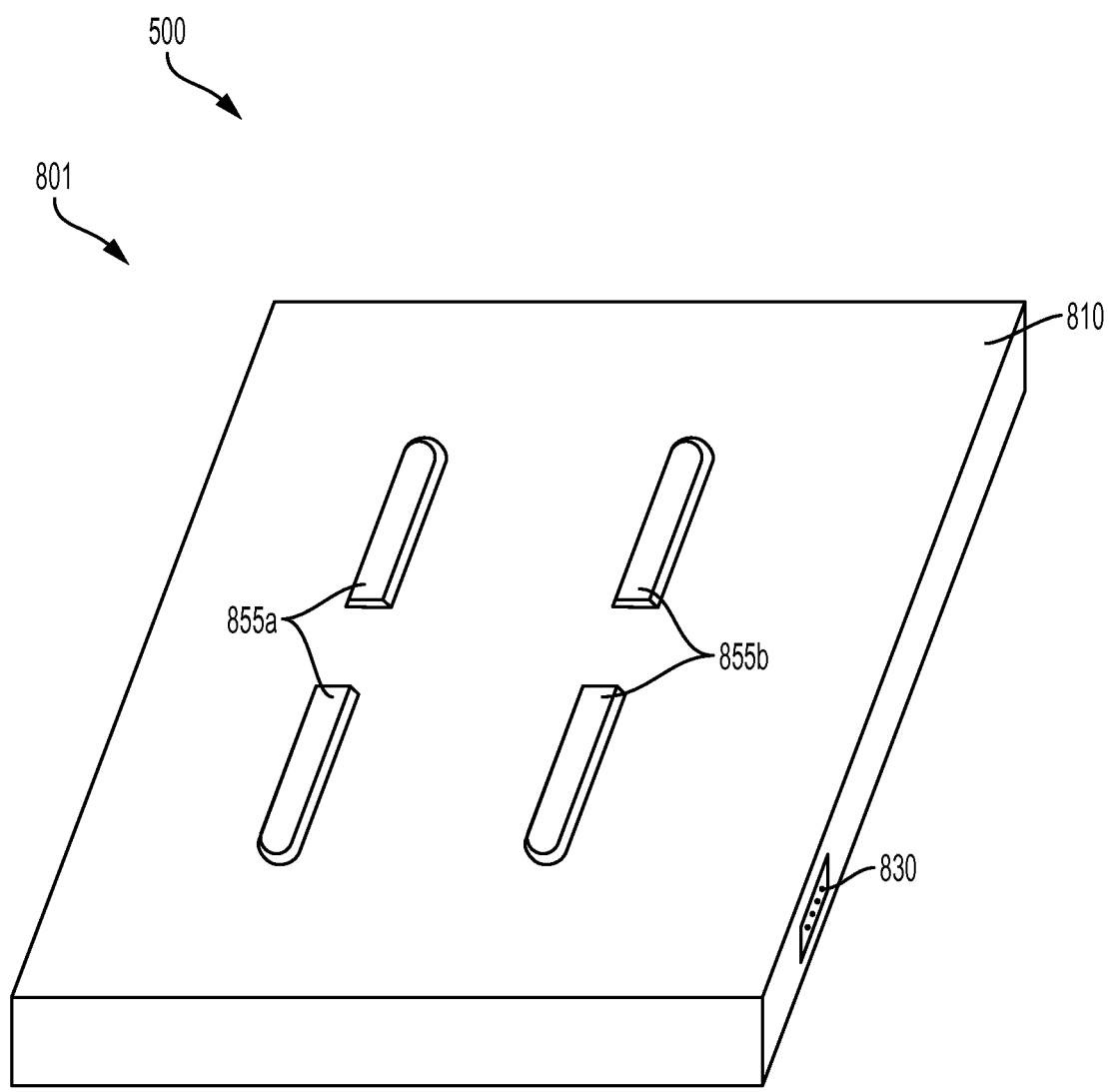
FIG. 20 depicts a perspective view of a fifth embodiment of a charging station.
Figure 21:
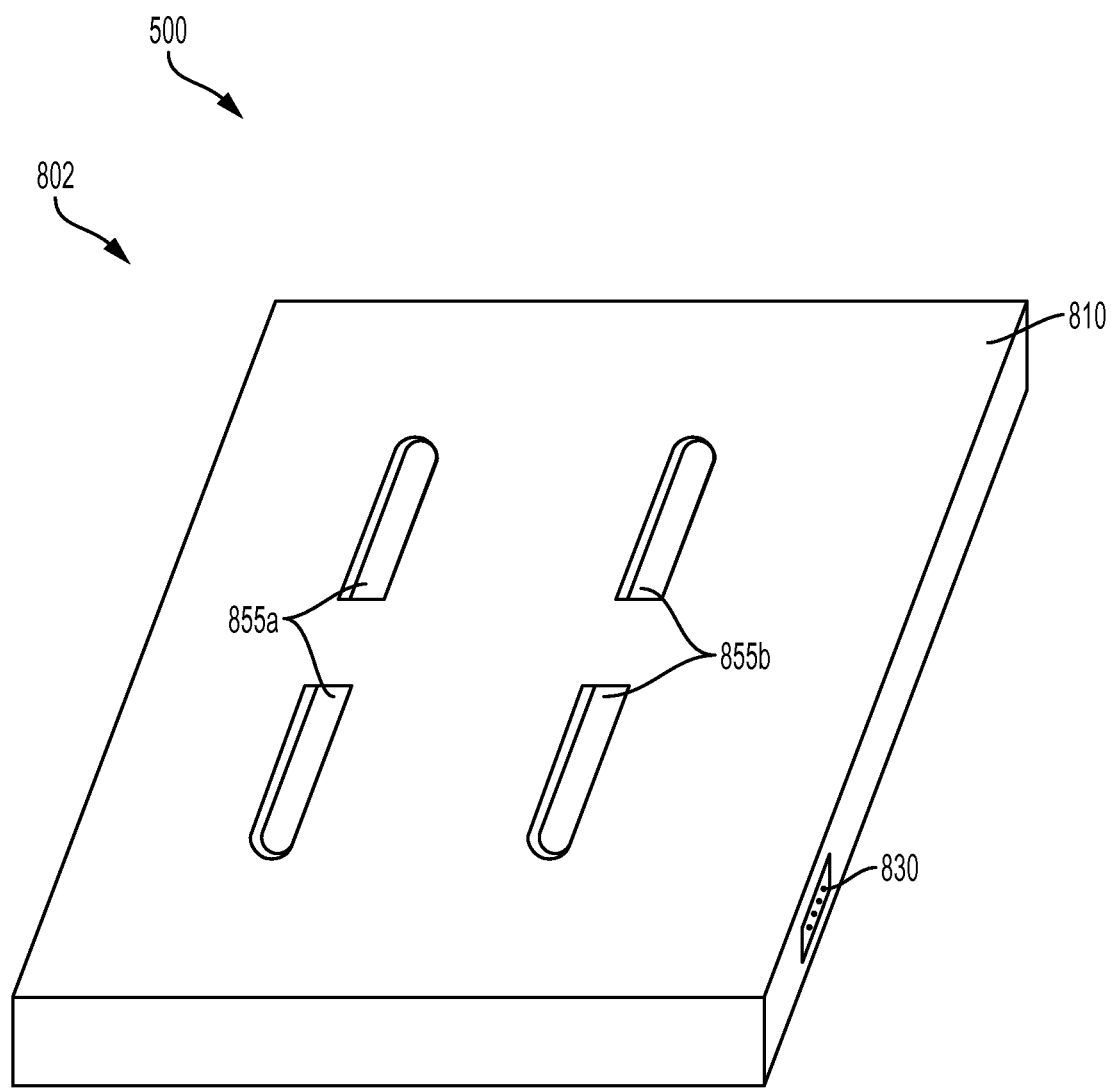
FIG. 21 depicts a perspective view of a sixth embodiment of a charging station.
Figure 22:
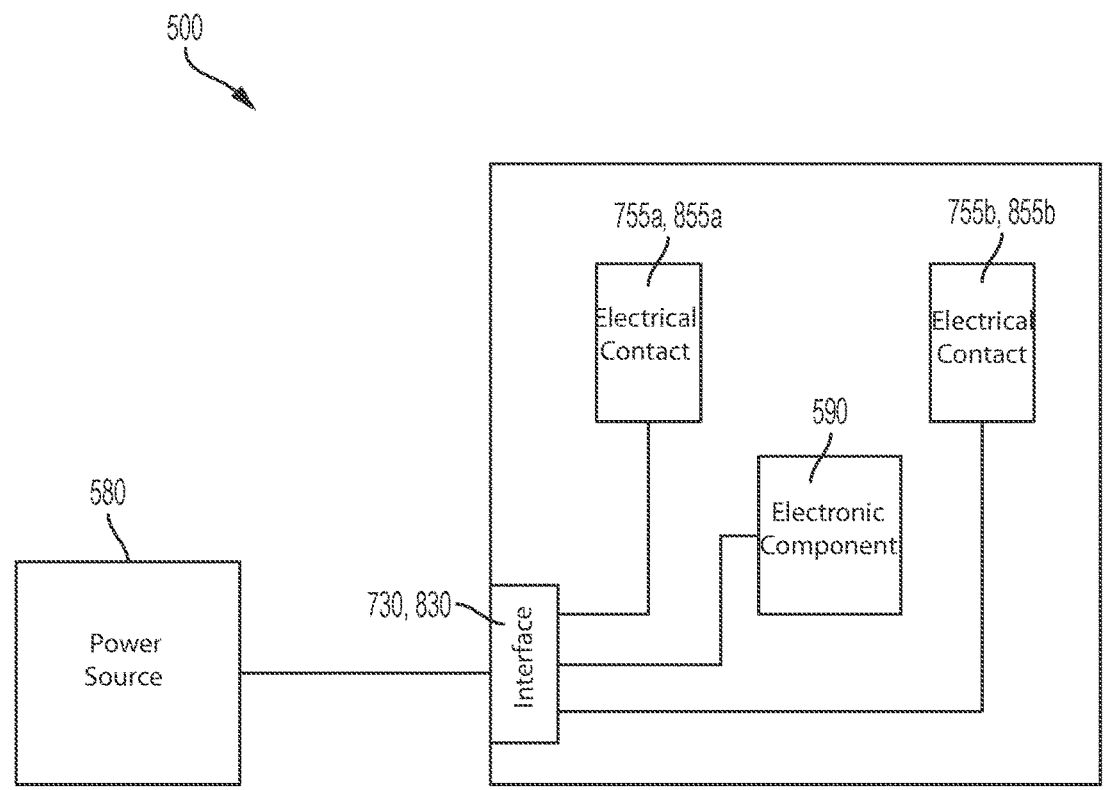
FIG. 22 depicts a schematic view of an embodiment of the charging station being electrically coupled to an external power supply.

Referring still to the drawings, FIGS. 16-21 depict various embodiments of a charging station 500. Embodiments of the charging station 500 may coact with the aerial vehicle 200 to recharge a power source 261, such as a rechargeable battery, of the aerial vehicle 200. Embodiments of the charging station 500 may be a surface 710 that can accommodate a landing of aerial vehicle 200, wherein the charging station 500 is connected to an electrical power source, such as power source 580. The surface 710 of the charging station 500 may be raised, or it can be built-in to an existing or larger surface. Embodiments of the charging station 500 may also be mobile or portable for temporary and/or strategic placement. Moreover, embodiments of the charging station 500 may include an interface 730 for interfacing with a power source. For instance, the interface 730 may be an electrical socket or receptacle for receiving a plug, wherein the plug is providing electricity from a power source 580. Alternatively, the charging station 500 may be integrated into a power source, and not require a connection or connector, such as a plug, to the interface 730. The power source 580 for providing the power to the charging station 500 may be an electrical grid, another battery, a generator, an alternative energy power source, and the like. Further, embodiments of the charging station may include electronic components 590, powered by the power source 580, as shown in FIG. 22 Electronic components, embodied by 590, may include electrical components, computers, transmitters, receivers, sensors, lights, and the like.

Figure 16:
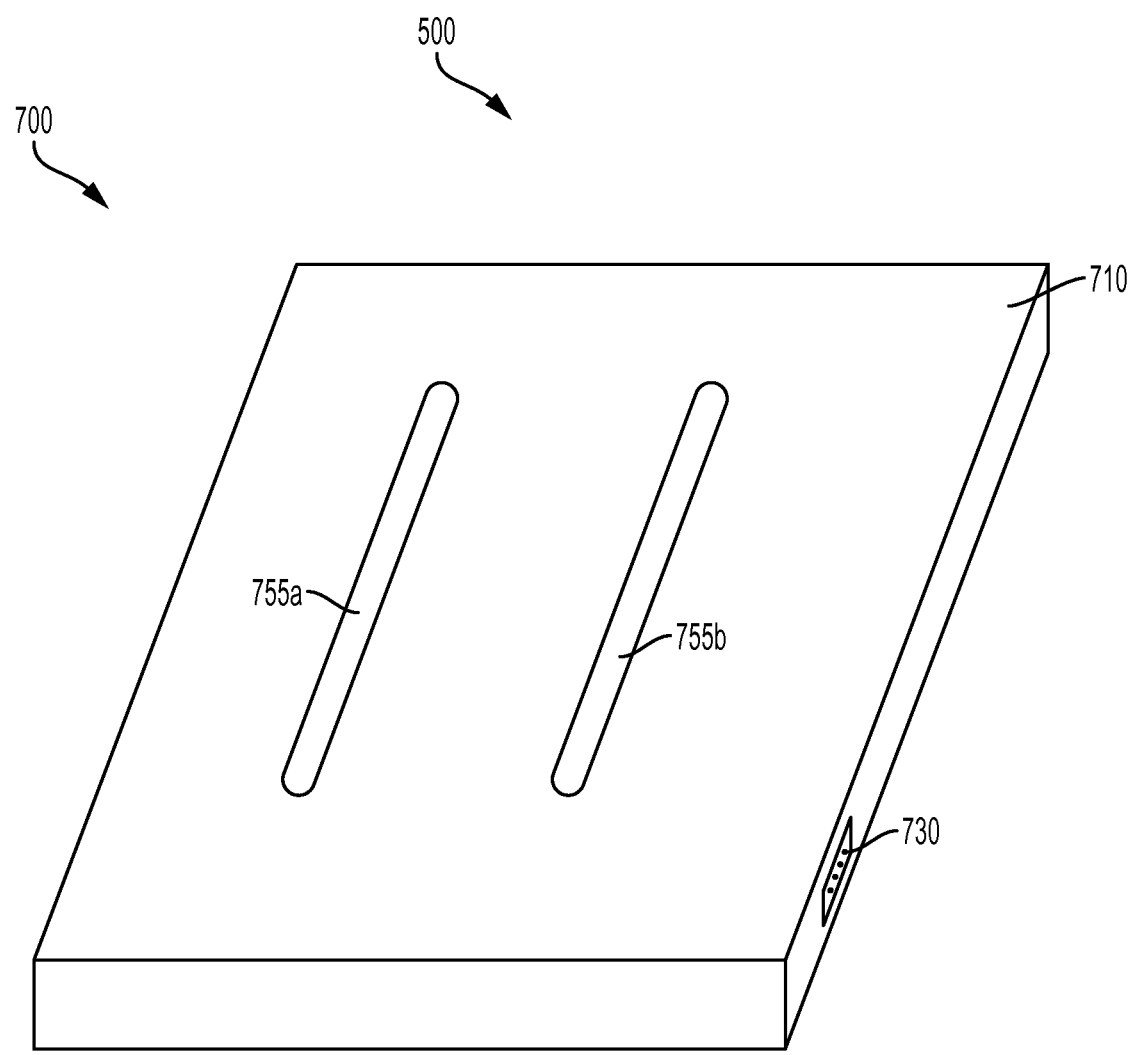
FIG. 16 depicts a perspective view of a first embodiment of a charging station.
Figure 17:
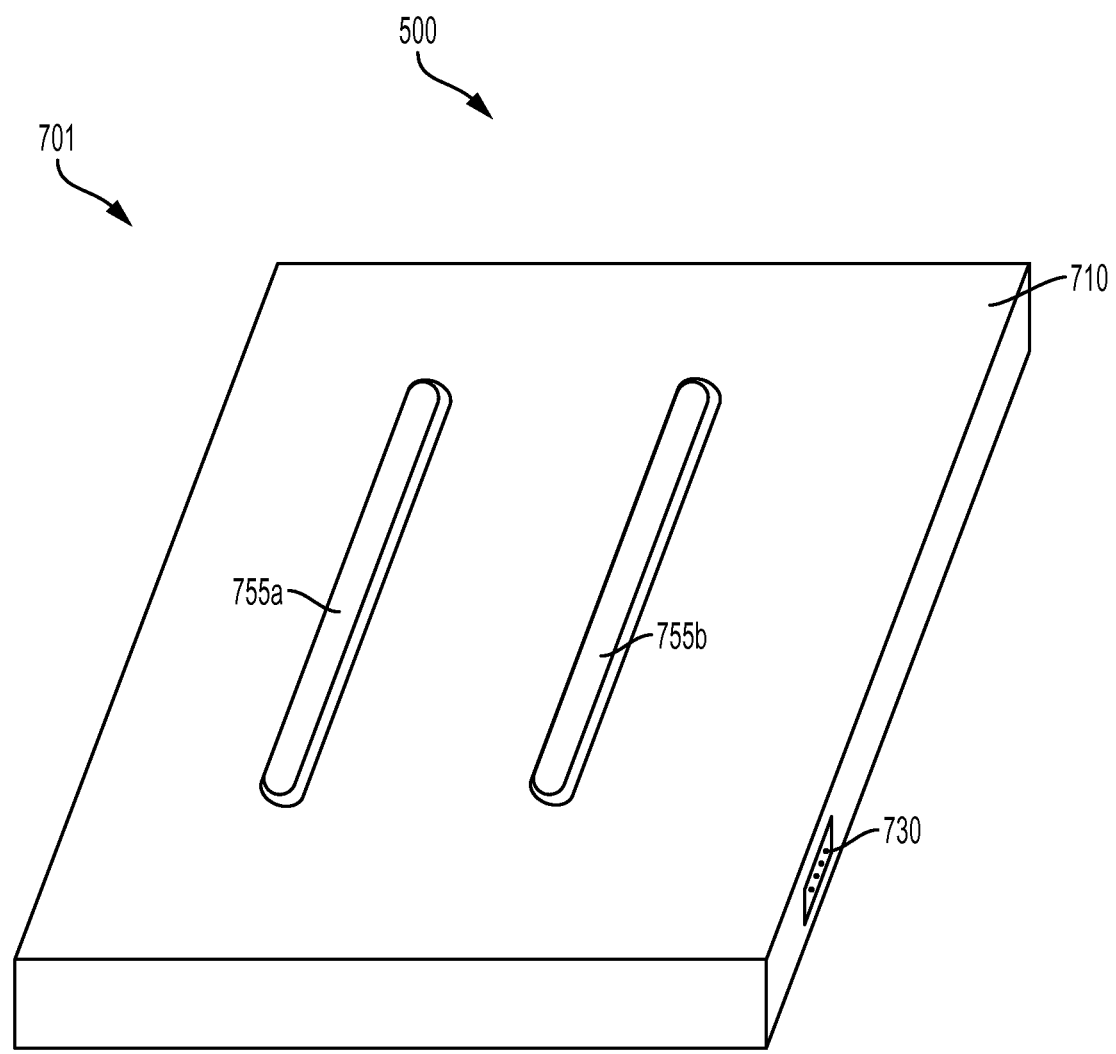
FIG. 17 depicts a perspective view of a second embodiment of a charging station.
Figure 18:
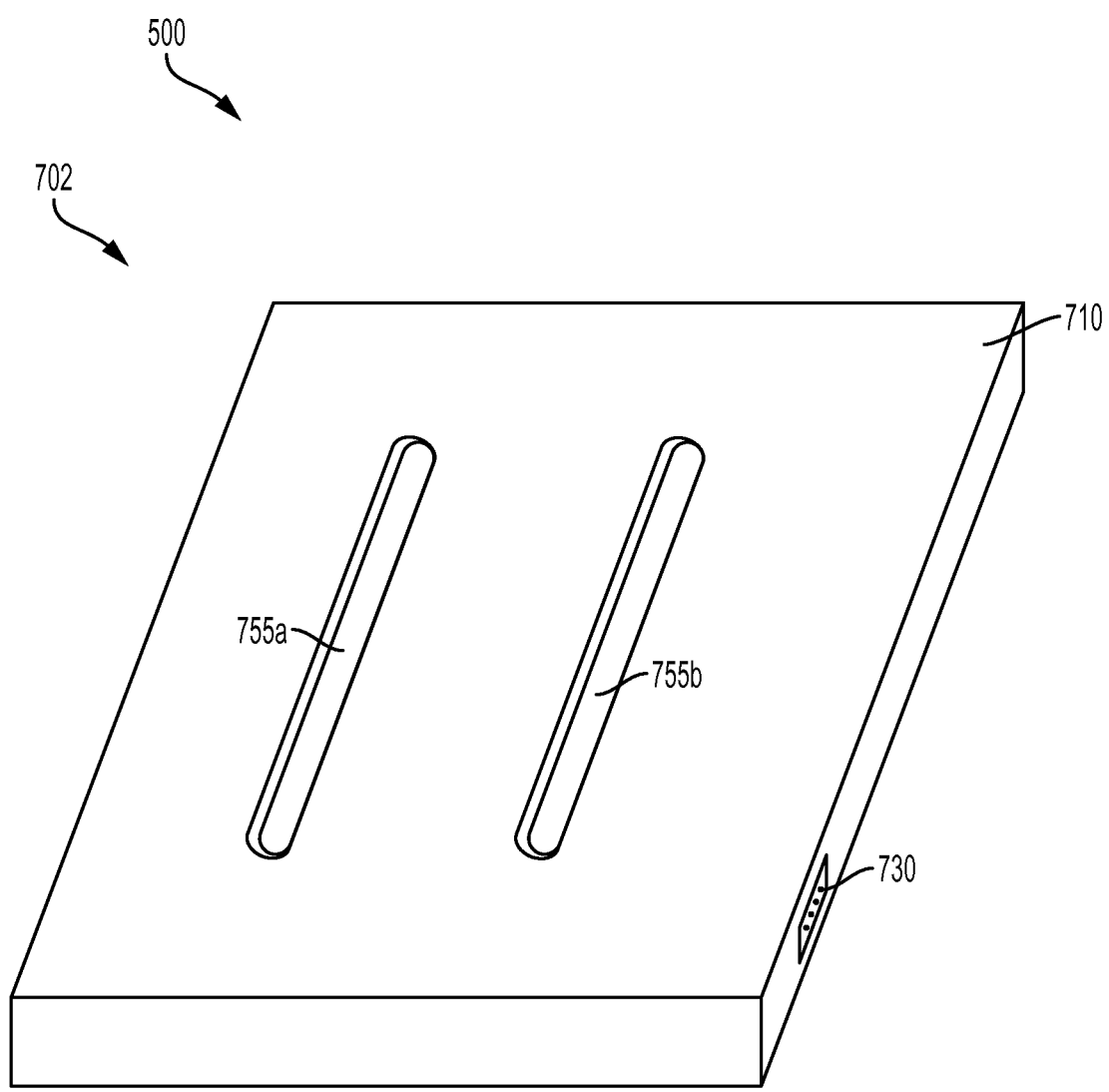
FIG. 18 depicts a perspective view of a third embodiment of a charging station.
Figure 19:
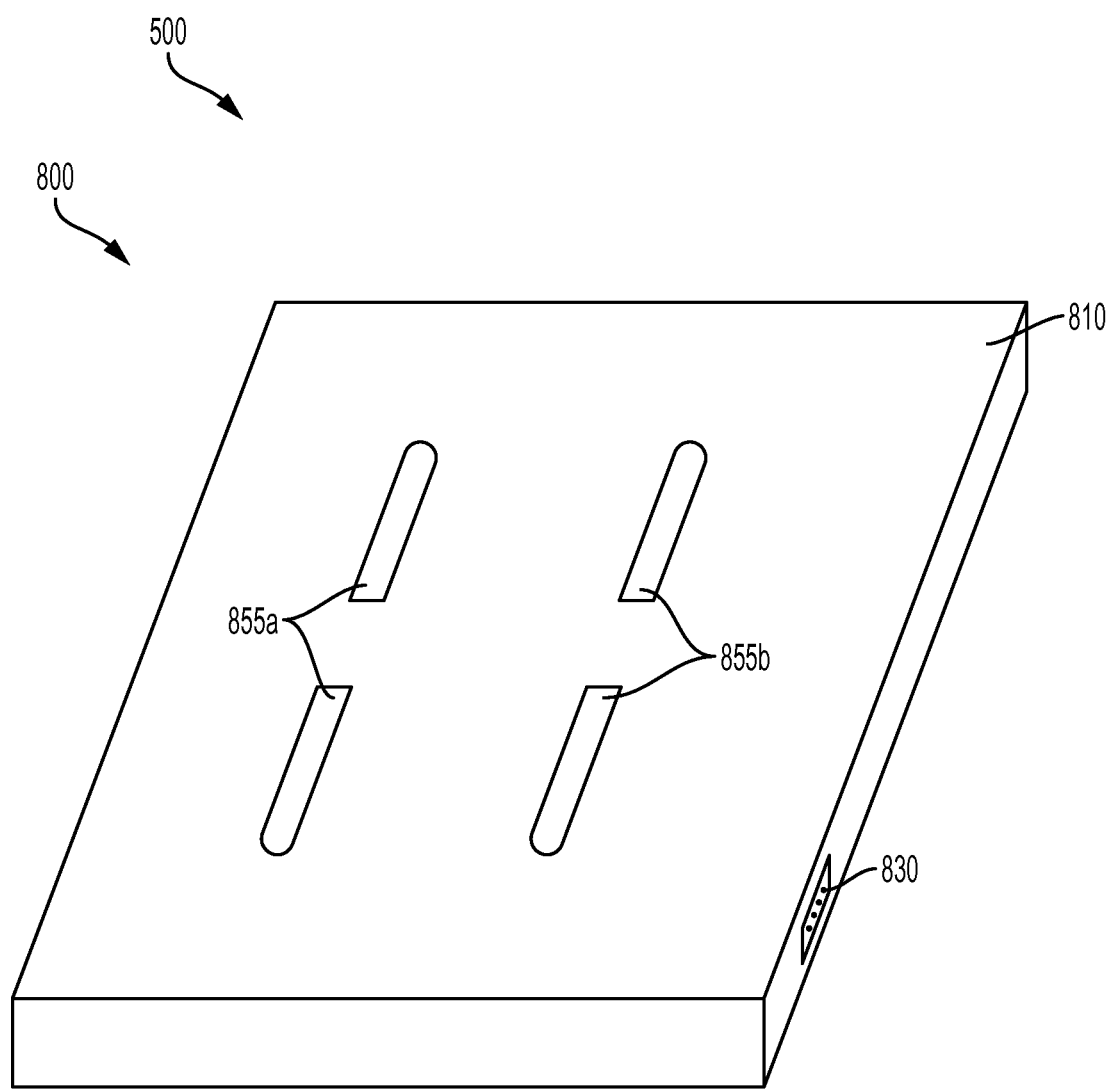
FIG. 19 depicts a perspective view of a fourth embodiment of a charging station.

Furthermore, embodiments of the charging station 500 may include a first electrical contact 755a and a second electrical contact 755b. The electrical contacts 755a, 755b of the charging station 500 may be disposed on the surface 710 of the charging station 500. The contacts 755a, 755b may be flush with the surface 710 of the charging station 500, as shown in FIG. 16. In another embodiment, the contacts 755a, 755b may be partially protruding above the surface 710, as shown in FIG. 17. In yet another embodiment, the contacts 755a, 755b may be slightly recessed from the surface 710 of the charging station 500, as shown in FIG. 18. Contacts 755a, 755b may be a conductive element configured to engage and/or dock with a corresponding contact 255a, 255b located on a landing gear structure 250 of the aerial vehicle 200. Thus, embodiments of the contacts 755a, 755b may be comprised of an electrically conductive material, or may be coated with an electrically conductive material. Contacts 755a, 755b may be sized and dimensioned to correspond with the size and shape of the contacts 255a, 255b of each skid 251a, 251b. Likewise, the contacts 755a, 755b on the charging station 500 may be spaced apart from each other a distance that corresponds to the distance that the skids 251*a*, 251*b* are spaced apart from each other. FIGS. 16-18 depict embodiments of a charging station 500 that includes contacts 755*a*, 755*b* that may correspond to embodiments of an aerial vehicle 200 that has a landing gear structure 250, 250*a*, 350. FIGS. 19-21 depict embodiments of a charging station 500 that includes contacts 855*a*, 855*b* that are comprised of more than one portion. For instance, the separation of the electrical contacts 755*a*, 755*b* into a plurality of sections 855*a*, 855*b* may electrically isolate the contacts 755*a*, 755*b* that are configured to engage with contacts 256, 355*a*, 355*b* that may require electrical isolation from each other. The contacts 855*a*, 855*b* may be flush with the surface 710 of the charging station 500, as shown in FIG. 19. In another embodiment, the contacts 855*a*, 855*b* may be partially protruding above the surface 710, as shown in FIG. 20. In yet another embodiment, the contacts 855*a*, 855*b* may be slightly recessed from the surface 710 of the charging station 500, as shown in FIG. 21.

Figure 23:
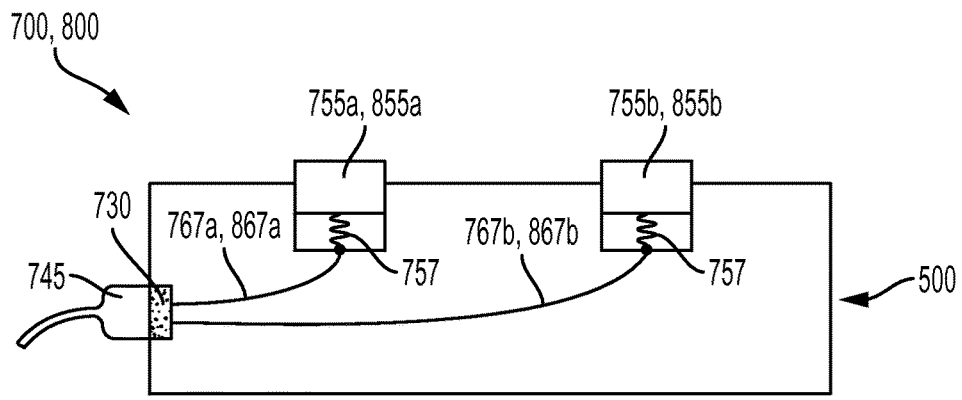
FIG. 23 depicts a cross-sectional view of an embodiment of the charging station in a first position.
Figure 24:
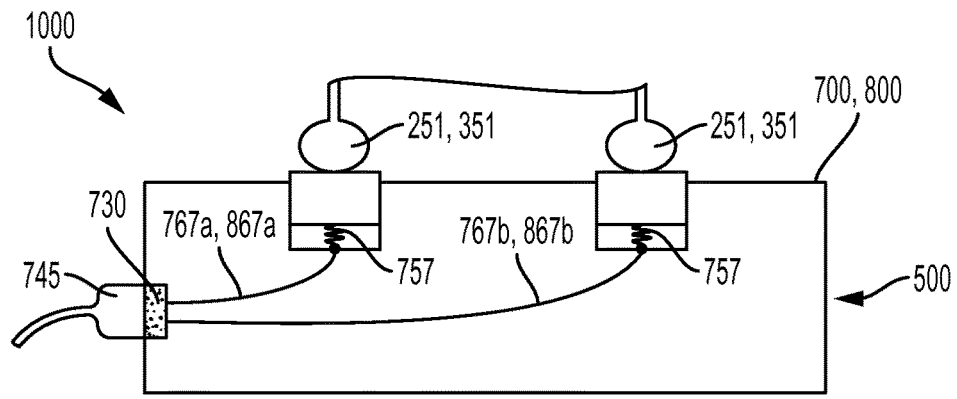
FIG. 24 depicts a cross-sectional view of an embodiment of the charging station in a second position, being engaged with the landing gear structure.

Referring now to FIGS. 23 and 24, embodiments of the electrical contacts 755*a*, 755*b*, 855*a*, 855*b* may be depressible. Each of the contacts 755*a*, 755*b*, 855*a*, 855*b* may be coupled to the charging station 500 by at least one biasing element 757. For instance, the biasing element 757 may be connected to the contacts 755*a*, 755*b*, 855*a*, 855*b* at one end, and connected to a portion or surface of the charging station 500. This connection can be established in a variety of ways, including a soldered connection. Embodiments of the biasing element 757 may be a spring, a coiled structure, a compression spring, or any component that exhibits a biasing quality. Embodiments of the biasing element 757 may be electrically conductive to electrically connect the contacts 755*a*, 755*b*, 855*a*, 855*b* to the power source of the charging station 500 or a power source 580 external to the charging station 500 that is supplying electricity to the charging station 500. The biasing elements 757 may bias the contacts 755*a*, 755*b*, 855*a*, 855*b* when the aerial vehicle 200 lands on the charging station 500, urging the contacts 755*a*, 755*b*, 855*a*, 855*b* toward the electrical contacts 255*a*, 255*b*, 256, 355*a*, 355*b* of the aerial vehicle 200 to promote, establish, ensure, etc. firm electrical and mechanical contact between the contacts of the aerial vehicle 200 and the contacts of the charging station 500. In other words, the electrical contacts 755*a*, 755*b*, 855*a*, 855*b* may be depressible within a recess or other opening of the charging station 500. The recessed portion of the charging station 500 may accommodate the insertion, or partial insertion of the contacts 755*a*, 755*b*, 855*a*, 855*b*. FIG. 23 depicts an embodiment of the electrical contacts 755*a*, 755*b*, 855*a*, 855*b* of the charging station 500 in a first position. The first position may refer to a position of non-engagement with the aerial vehicle 200. FIG. 24 depicts an embodiment of the electrical contacts 755*a*, 755*b*, 855*a*, 855*b* in a second position. The second position may refer to a position of engagement with an electrical contact of the aerial vehicle 200. In the second position, the biasing element 757 are compressed, exerting a biasing force against the contacts 755*a*, 755*b*, 855*a*, 855*b*, urging the contacts 755*a*, 755*b*, 855*a*, 855*b* in an opposing direction (i.e. toward the landing gear structure of the aerial vehicle 200). The biasing effect promotes continued electrical and mechanical contact during charging, until the aerial vehicle 200 disengages or departs from the charging station 500.

Figure 25:
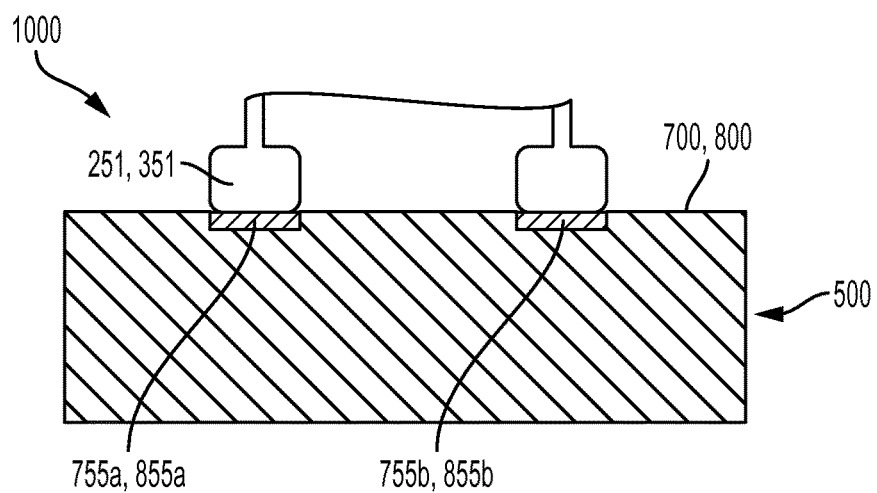
FIG. 25 depicts a cross-sectional view of an alternative embodiment of the charging station, being engaged with the landing gear structure.

Referring still to FIGS. 23 and 24, embodiments of the biasing elements 757 may establish a conductive path to a power source of the charging station 500. For instance, a wire 767*a*, 767*b* may be mechanically and electrically connected to (e.g. soldered) to the biasing elements 757. Embodiments of the wires 767*a*, 767*b* may be an electrical wire or cable capable of conducting an electrical signal (e.g. current). Embodiments of the wires 767*a*, 767*b* may include a protective, dielectric jacket. The wires 767*a*, 767*b* may electrically couple the contacts 755*a*, 755*b*, 855*a*, 855*b* to the power source 580 of the charging station. FIG. 25 depicts an embodiment of a charging station 500 that does not include biasing elements 757, wherein the contacts are statically disposed within the charging station 500.

Further embodiments of the charging station 500 may include an induction coil that creates an alternating electromagnetic field from within the charging station 500. For example, the charging station 500 may include a primary induction coil, wherein an aerial vehicle 200 may include a secondary induction coil. The electromagnetic field created by the induction coil of the charging station 500 may be used to transfer energy between the charging station and the aerial vehicle 200. When the aerial vehicle 200 is proximate the charging station 500, the charging station 500 may wirelessly charge the aerial vehicle 200 through inductive charging.

Accordingly, system 1000 may be a system for replenishing a power source of a remotely controlled aerial vehicle 200. As shown in at least FIGS. 23-25, the mechanical contact, engagement, docking, touching, etc. of the landing gear structure 250, 250*a*, 350 with the charging station 500 may establish an electrical path from a power source 580 external to the aerial vehicle 200 to a power source 261 of the aerial vehicle 200. The electrical path established by the physical engagement of these components may recharge the power source 261 of the aerial vehicle 200 that may be drained due to activity in the field. Aerial vehicle 200 may be programmed to accurately land on/dock with the charging station 500. Moreover, the aerial vehicle 200 may be in communication with the charging station 500 to more precisely dock with the charging station 500. For example, when the aerial vehicle becomes within a certain proximity to the charging station 500, a communication link may be established for accurate docking. In some embodiments, the charging station 500 may assume control of the aerial vehicle 200 when the aerial vehicle 200 is within a proximity of the charging station 500, or when a signal is transmitted from the aerial vehicle 200 that the power source 261 needs to be recharged. Various programming of the flight controls may be utilized by those skilled in the art to effectuate a precise landing/docking. In some embodiments, the charging station 500 may include a drive system 807 (e.g., a motor) connected to wheels 801*a*-801*d* (e.g., via axles). For example, when the aerial vehicle becomes within a certain proximity to the charging station 500, a communication link may be established and charging station 500 may be automated to receive a control signal and direct the drive system 807 to move the charging station 500 to a specified location to meet with the aerial vehicle 200 for charging. Embodiments of the charging station 500 may also include one or more temperature sensor in communication with the electronic components 590 to detect a temperature of the aerial vehicle. Sensing a temperature of the aerial vehicle, or the amount of heat given off by the power source 261 may initiate a shutdown of charging the power source 261 until the temperature of the power source 261 has reduced to a safe level for effective recharging of the power source 261.

Figure 26:
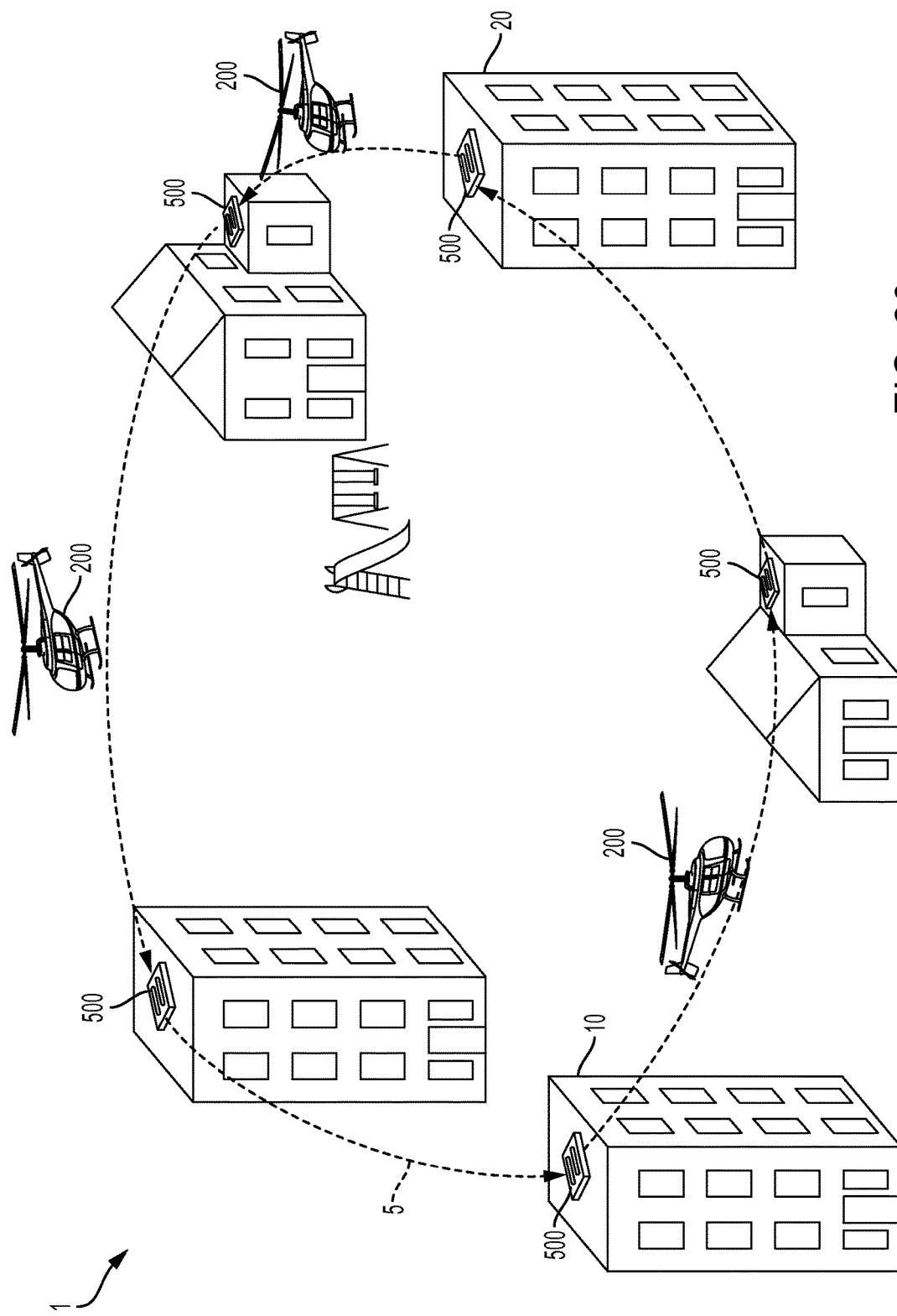
FIG. 26 depicts an embodiment of a programmed flight path for continuous surveillance of a community.

Referring now to FIG. 26, embodiments of a method of continuous security surveillance of a community 1 may comprise the following steps: programming a flight path 5 for an aerial vehicle 200 to fly from a first location 10 to a second location 20 of the community, placing a charging station 500 for the aerial vehicle 200 at the first location 10 and the second location 20, wherein the programmed flight path 5 includes stops at the charging station 500 to recharge a power source 261 of the aerial vehicle 200. Embodiments of the method may include more than two locations, wherein multiple charging stations 500 may be located at as many locations as desired. Embodiments of the aerial vehicle 200 and the charging station 500 may be used for continuous surveillance of a community 1, such as a neighborhood, commercial property, port, park, public spaces, or any geographical location where a community of inhabitants can be found, or have an interest in the security of the location. For example, a community 1 may be a neighborhood, and the people that live within that neighborhood may be considered inhabitants of that neighborhood. Each inhabitant, or family of inhabitants, or interested party within the community or having an interest in the community may have an interest in the aerial vehicle 200 to deter any mischievous, criminal, destructive, etc. actions by the inhabitants of the community 1 under surveillance. An interest may include a financial interest, in addition to non-financial interests. In other words, embodiments of the aerial vehicle 200 may be community-owned, such that the inhabitants of the community 1 are likely to accept its presence, and not target it for destruction.

Furthermore, the aerial vehicles 200 may be programmed to have a specific programmed flight path 5. The programmed path 5 may be designed to pass through various areas of the community 1. The programmed flight path 5 may be changed during flight. A charging station 500 may be placed at one or more locations within the community 1 to allow the aerial vehicles 200 to recharge their onboard battery as described above. In other words, one or more charging stations 500 may be placed along the programmed flight path 5. However, one or more charging stations 500 may be placed along the programmed flight path at a location other than the first location or other location of the community 1. For instance, the programmed flight path 5 may include stops to recharge the UAV at a plurality of charging stations 500 in the field so that long, sustained flights are possible. With the ability to recharge the battery as part of a programmed flight path 5, the aerial vehicle 200 need not return to ground and may continue to fly and perform surveillance of the community 1. In addition, more than one aerial vehicle 200 may share the same programmable flight path 5, wherein each aerial vehicle 200 may start at a different point in the flight path 5. In embodiments where a plurality of aerial vehicles share the same programmed flight path 5, an aerial vehicle 200 may be present in more areas of a community 1 at the same time. Accordingly, continuous surveillance may be provided to a community, which communities 1 may desire because it can deter crime and other undesirable conditions and events.

Moreover, the aerial vehicles 200 following the programmed flight path 5 may be able to communicate with each other to react to any scenario that requires additional surveillance. If the aerial vehicles 200 are performing surveillance of a community but are following separate programmed flight paths, they may still communicate with each other. Data can also be transmitted to ground control or other location that may analyze the information.

Figure 27:
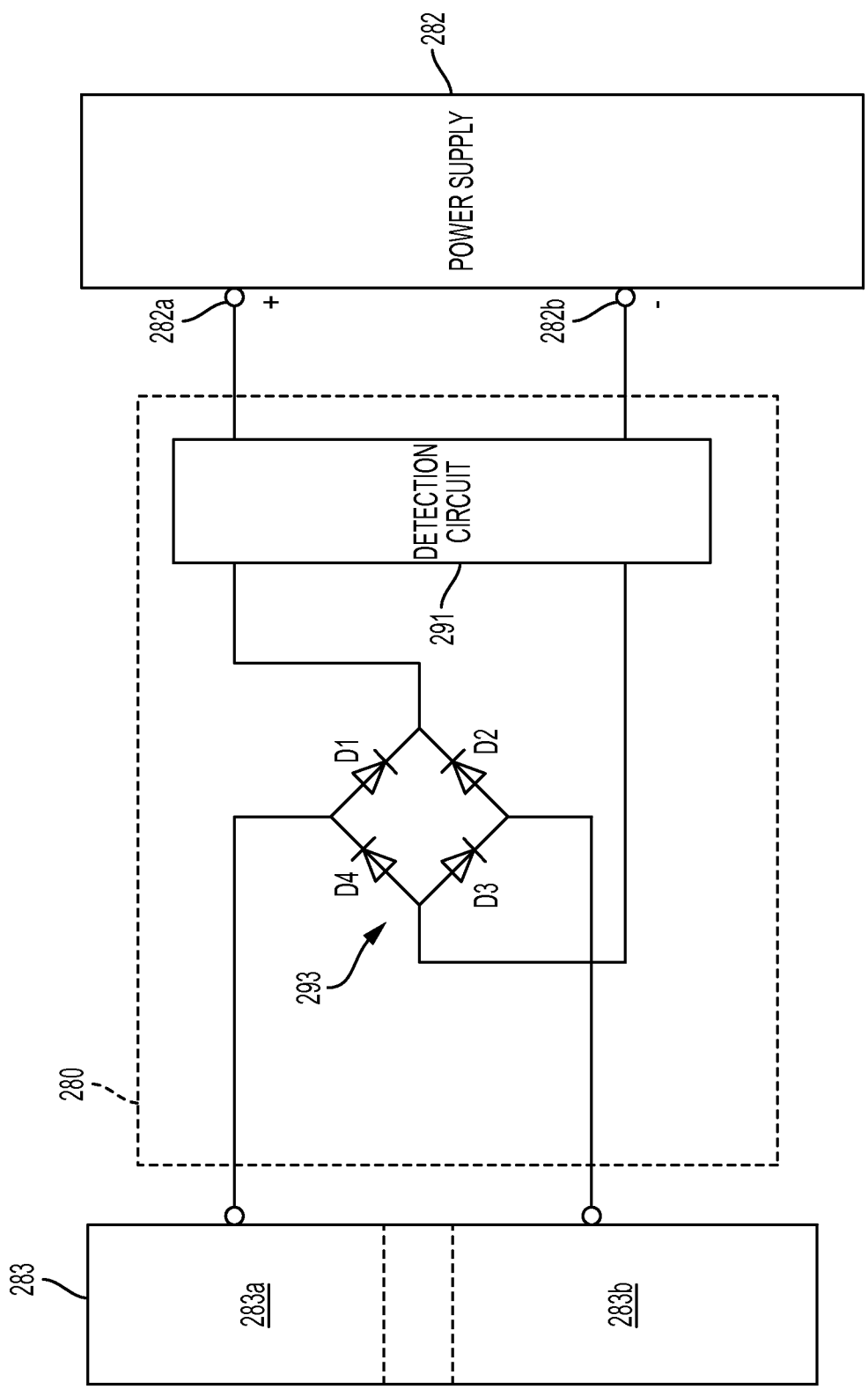
FIG. 27 depicts an embodiment of a polarity switching circuit for enabling a correct polarity between an onboard battery and power supply of a charging station.

FIG. 27 depicts an example of a polarity switching circuit 280 for enabling a correct polarity between an onboard battery 283 (e.g., of remotely controlled aerial vehicle 200 Of FIG. 2) and power supply 282 of a charging station (e.g., charging station 500 of FIG. 2). Polarity switching circuit 280 comprises a rectifier circuit 293 (comprising rectifier diodes D1-D4) and a detection circuit 291. Polarity switching circuit 280 may comprise an independent circuit removably connected between onboard battery 283 and power supply 282. Alternatively, polarity switching circuit 280 may be comprised by battery 283 or power supply 282. Polarity switching circuit 280 rectifies a voltage signal so that battery 283 always receives a correct polarity when connected to power supply 282 for charging. For example, if a remotely controlled aerial vehicle lands on a charging station such that section 283a of battery 283 comprises a cathode portion (i.e., positive side) of battery 283, voltage flow will be enabled between section 283a and positive terminal 282a of power supply 282 via rectifier diode D1 while rectifier diode D4 prevents voltage flow to negative terminal 282b of power supply 282. Likewise, section 283b of battery 283 comprises an anode portion (i.e., negative side) of battery 283 and therefore a negative signal (i.e., ground) flow will be enabled between section 283b and negative terminal 282b of power supply 282 via rectifier diode D3 while rectifier diode D2 prevents the negative signal from flowing to positive terminal 282a of power supply 282. Alternatively, if the remotely controlled aerial vehicle lands on the charging station such that section 283a of battery 283 comprises an anode portion of battery 283, a negative signal (i.e., ground) flow will be enabled between section 283a and negative terminal 282b of power supply 282 via rectifier diode D4 while rectifier diode D1 prevents the negative signal from flowing to positive terminal 282a of power supply 282. Likewise, section 283b of battery 283 comprises a cathode portion (i.e., positive side) of battery 283 and therefore voltage flow will be enabled between section 283b and positive terminal 282a of power supply 282 via rectifier diode D2 while rectifier diode D3 prevents voltage flow to negative terminal 282b of power supply 282. Further embodiments of detection circuit 291 may comprise circuitry for detecting and correcting a voltage drop between correctly matched terminals of battery 283 and power supply 282. For example, detection circuit 291 may include batteries, a power supply, and relays for detecting a voltage drop and enabling a voltage flow (via rectifier circuit 293 and/or the relays) from the power supply 282 and/or the batteries and/or power supply (with detection circuit 291) to the battery 283 in order to enable a charging process. Further embodiments of polarity switching circuit 280 may comprise a relay switching circuit (i.e., as an alternative to rectifier circuit 293) for detecting polarity and enabling a correct polarity between onboard battery 283 and power supply 282, as known to those skilled in the art.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:
1. A remotely controlled aerial vehicle comprising:
an airframe;
a landing gear structure operably connected to the airframe, the landing gear structure including a first skid and a second skid, wherein the first skid and the second skid each have a recessed area along a bottom portion of the first skid and the second skid;

a first electrical contact connected to the first skid by a first biasing element, and connected to a positive terminal of a battery housed by the airframe; and a second electrical contact connected to the second skid by a second biasing element, and connected to a negative terminal of the battery housed by the airframe;

wherein the first biasing element and the second biasing element urge the first electrical contact and the second electrical contact, respectively, in a direction away from the first skid and the second skid when the first electrical contact and the second electrical contact are mechanically engaged with a charging station to promote contact therebetween;

wherein the landing gear structure further includes a first connecting shaft that directly connects the first skid to the airframe, and a second connecting shaft that directly connects the second skid to the airframe;

wherein the second biasing element operably connected to the second skid includes a wire that connects to the negative terminal of the battery, wherein the wire passes through an open channel of the second connecting shaft;

wherein a dielectric element is disposed between a first portion and a second portion of the first electrical contact to electrically isolate the first portion and the second portion.

2. The remotely controlled aerial vehicle of claim 1, wherein the first biasing element and the second biasing element electrically couple the first electrical contact and the second electrical contact, respectively, to the battery of the remotely controlled aerial vehicle.

3. The remotely controlled aerial vehicle of claim 2, wherein the first biasing element operably connected to the first skid includes a wire that connects to the positive terminal of the battery, wherein the wire passes through an open channel of the first connecting shaft.

4. The remotely controlled aerial vehicle of claim 1, wherein the recessed area of the first skid and the second skid accommodates the first electrical contact and the second electrical contact when the first biasing element and the second biasing element is compressed.

5. A system comprising:
an aerial vehicle having an airframe and a power source onboard the aerial vehicle, the power source housed within the airframe, wherein the aerial vehicle includes a landing gear structure having a first electrical contact and a second electrical contact, wherein the landing gear structure further includes a first connecting shaft that directly connects the first skid to the airframe, and a second connecting shaft that directly connects the second skid to the airframe, the second biasing element operably connected to the second skid includes a wire that connects to the negative terminal of the battery and passes through an open channel of the second connecting shaft, further wherein a dielectric element is disposed between a first portion and a second portion of the first electrical contact to electrically isolate the first portion and the second portion; and a charging station having a first electrical contact and a second electrical contact;

wherein the aerial vehicle is programmed to dock with the charging station when the battery is in need of recharging, the docking being a mechanical engagement between the first electrical contact and the second electrical contact of the aerial vehicle with the first electrical contact and the second electrical contact of the charging station.

6. The system of claim 5, wherein the charging station communicates with the aerial vehicle when the aerial vehicle transmits a signal that the power source of the aerial vehicle needs to be recharged.

7. The system of claim 5, wherein the charging station is connected to a conventional power supply.

8. The system of claim 5, wherein the first electrical contact and the second electrical contact of the charging station are depressible upon impact of the aerial vehicle.

9. The system of claim 5, wherein the charging station is portable.

10. The system of claim 5, wherein the charging station is integrated into an existing surface.

11. The system of claim 5, wherein the first electrical contact and the second electrical contact of the landing gear structure are depressible.

12. The system of claim 5, further comprising:
a polarity switching circuit connected between the power source and the charging station, wherein the polarity switching circuit is configured to enable a correct polarity connection between the power source and the charging station.

13. A method of continuous security surveillance of a community, comprising:
programming a flight path for an aerial vehicle to fly from a first location to a second location of the community, the aerial vehicle having an airframe and a battery onboard the aerial vehicle, the battery housed within the airframe, wherein the aerial vehicle includes a first electrical contact connected to the first skid by a first biasing element, and connected to a positive terminal of a battery housed by the airframe, a second electrical contact connected to the second skid by a second biasing element, and connected to a negative terminal of the battery housed by the airframe, wherein the first biasing element and the second biasing element urge the first electrical contact and the second electrical contact, respectively, in a direction away from the first skid and the second skid when the first electrical contact and the second electrical contact are mechanically engaged with a charging station to promote contact therebetween, wherein the landing gear structure further includes a first connecting shaft that directly connects the first skid to the airframe, and a second connecting shaft that directly connects the second skid to the airframe, wherein the second biasing element operably connected to the second skid includes a wire that connects to the negative terminal of the battery, wherein the wire passes through an open channel of the second connecting shaft, wherein a dielectric element is disposed between a first portion and a second portion of the first electrical contact to electrically isolate the first portion and the second portion;

placing a charging station for the aerial vehicle at the first location and the second location;

wherein the programmed flight path includes stops at the charging station to recharge a power source located within the airframe of the aerial vehicle, wherein the aerial vehicle is recharged based on a biasing engagement between the charging station and the aerial vehicle.

14. The method of claim 13, wherein the aerial vehicle is community-owned.

15. The method of claim 13, wherein the first skid and the second skid each have a recessed area along a bottom portion of the first skid and the second skid.

16. The method of claim 13, wherein the charging station communicates with the aerial vehicle when the aerial vehicle transmits a signal that the power source of the aerial vehicle needs to be recharged.

17. The method of claim 16, wherein if the signal is transmitted by the aerial vehicle, causing the aerial vehicle to continue to the nearest charging station along the programmed flight path for docking with the nearest charging station.

18. The method of claim 13, wherein the community is a neighborhood having inhabitants that own the aerial vehicle.

19. The method of claim 13, wherein one or more charging stations are placed along the programmed flight path at a location other than the first location or other location.

* * * * *